US011816775B2

(12) United States Patent
Zhang et al.

(10) Patent No.: US 11,816,775 B2
(45) Date of Patent: Nov. 14, 2023

(54) IMAGE RENDERING METHOD AND APPARATUS, AND ELECTRONIC DEVICE

(71) Applicant: HUAWEI TECHNOLOGIES CO., LTD., Guangdong (CN)

(72) Inventors: Fan Zhang, Shenzhen (CN); Baocheng Gu, Nanjing (CN); Dong Wei, Shenzhen (CN); Quan Gao, Hangzhou (CN); Yixin Deng, Nanjing (CN); Xinchao Peng, Nanjing (CN); Jia Luo, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 17/482,124

(22) Filed: Sep. 22, 2021

(65) Prior Publication Data

US 2022/0005255 A1 Jan. 6, 2022

Related U.S. Application Data

(63) Continuation of application No. PCT/CN2020/078663, filed on Mar. 10, 2020.

(30) Foreign Application Priority Data

Mar. 22, 2019 (CN) .......................... 201910224224.3

(51) Int. Cl.
*G06T 15/00* (2011.01)
*G06T 1/20* (2006.01)

(52) U.S. Cl.
CPC .............. *G06T 15/005* (2013.01); *G06T 1/20* (2013.01)

(58) Field of Classification Search
None
See application file for complete search history.

(56) References Cited

U.S. PATENT DOCUMENTS

| 2007/0234195 | A1 | 10/2007 | Wells |
| 2009/0021513 | A1 | 1/2009 | Joshi et al. |
| 2018/0349797 | A1* | 12/2018 | Garvey ..................... G06F 9/46 |

FOREIGN PATENT DOCUMENTS

| CN | 101675453 A | 3/2010 |
| CN | 102508644 A | 6/2012 |
| CN | 103502983 A | 1/2014 |
| CN | 106504305 A | 3/2017 |
| CN | 107066430 A | 8/2017 |

(Continued)

OTHER PUBLICATIONS

Buck et al., Tracking Graphics State For Networked Rendering, Dec. 2000, HWWS, 87-95 (Year: 2000).*

(Continued)

*Primary Examiner* — Robert J Craddock
(74) *Attorney, Agent, or Firm* — Fish & Richardson P.C.

(57) ABSTRACT

The present disclosure relates to image rendering methods, apparatus, and electronic devices. One example method includes obtaining, by a central processing unit (CPU), an image command stream used to render an image frame, comparing the image command stream with a previous image command stream and, when a same drawing command exists in the two image command streams, instructing a graphics processing unit (GPU) to render the image frame based on a previously generated drawing target.

20 Claims, 13 Drawing Sheets

(56) References Cited

FOREIGN PATENT DOCUMENTS

CN  107464208 A  12/2017
CN  109472858 A  3/2019

OTHER PUBLICATIONS

PCT International Search Report and Written Opinion issued in International Application No. PCT/CN2020/078663 dated Jun. 4, 2020, 14 pages (with English translation).
Office Action in Chinese Appln. No. 201910224224.3, dated Nov. 22, 2022, 14 pages (with English translation).

* cited by examiner

IMAGE RENDERING METHOD AND APPARATUS, AND ELECTRONIC DEVICE

CROSS-REFERENCE TO RELATED APPLICATIONS

This application is a continuation of International Application No. PCT/CN2020/078663, filed on Mar. 10, 2020, which claims priority to Chinese Patent Application No. 201910224224.3, filed on Mar. 22, 2019. The disclosures of the aforementioned applications are hereby incorporated by reference in their entireties.

TECHNICAL FIELD

This application relates to the computer field, and in particular, to an image rendering method and apparatus, an electronic device, and the like.

BACKGROUND

With rapid development of terminal technologies, terminals such as computers and mobile phones can implement various functions by installing different application software. When some application software on the terminal is in a running state, both a central processing unit (Central Processing Unit, CPU) and a graphics processing unit (Graphics Processing Unit, GPU) in the terminal are used.

The GPU may implement an image rendering function under control of the CPU. The image rendering includes operations such as geometric transformation, projection transformation, perspective transformation, and window cropping, and a process of generating an image based on material information and lighting information. Specifically, the GPU receives an image command stream that is of a to-be-rendered image frame and that is sent by the CPU, performs an image rendering operation on the to-be-rendered image frame based on the image command stream, to obtain display data of the to-be-rendered image frame, and sends the display data to a display. The display displays an image based on the display data. The image command stream usually includes a plurality of drawing commands. The drawing command is used to generate a rendering target, to obtain the display data of the to-be-rendered image frame.

In a related technology, after receiving the image command stream sent by the CPU to the GPU, the GPU generates a rendering target based on each drawing command in the image command stream. Consequently, load of the GPU is relatively heavy, and power consumption of image rendering is relatively high.

SUMMARY

This application provides an image rendering method and apparatus, an electronic device, and the like, to reduce load of a GPU during image rendering.

The following describes this application from different aspects. It should be understood that mutual reference may be made to implementations and beneficial effects of the following different aspects.

"First" and "second" appearing in this application are merely intended to distinguish between two objects, and do not indicate a sequence.

According to a first aspect, an example embodiment of this application provides an image rendering method. The method includes: obtaining a first image command stream of a to-be-rendered image frame (which may also be referred to as a first image frame), where the first image command stream includes one or more first drawing commands; and when one or more first drawing commands exist, and the one or more first drawing commands are the same as one or more drawing commands in a second image command stream of a rendered image frame (which may also be referred to as a second image frame), instructing a graphics processing unit to render the to-be-rendered image frame based on a reusable drawing target, where the reusable drawing target is a drawing target generated based on the same one or more drawing commands in the rendered image frame.

The "drawing command" usually includes drawing parameters used to generate the drawing target, and that the drawing commands are the same usually indicates that the drawing parameters are the same. One or more may be understood as at least one.

In the following, the one or more drawing commands in the second image command stream are referred to as a "second drawing command". Same drawing commands in the first image command stream and the second image command stream are referred to as a "first target drawing command" and a "second target drawing command". It should be understood that the "first target drawing command" and the "second target drawing command" each may include one or more drawing commands.

It can be learned that, according to the image rendering method provided in this embodiment of this application, the graphics processing unit can reuse the generated drawing target, thereby reducing power consumption of generating the drawing target, effectively reducing load of the GPU, and further reducing power consumption of an entire image rendering process.

It should be noted that the image rendering method provided in the foregoing aspect is usually performed by a CPU (the following uses an example in which the CPU is an execution body for description). The foregoing graphics processing unit is usually a GPU, but the method may alternatively be applied to another type of processor, for example, the method may be performed by an application processor (the application processor is sometimes considered as a specific type of the CPU). The "graphics processing unit" in the method may alternatively be another new type of graphics processing unit that emerges with development of technologies.

In some implementations, one drawing command is used to generate one drawing target. In some implementations, a drawing command may alternatively be further subdivided. For example, one drawing command may include a plurality of lines of commands.

In some implementations, the "reusable drawing target" is a drawing target generated by the image processor based on the second target drawing command when the second image frame is rendered. In some other implementations, the "reusable drawing target" is generated before the second image frame is rendered, that is, the "reusable drawing target" is generated when the graphics processing unit renders an image frame before the second image frame. Then, when the second image frame is rendered, the drawing target is determined as a drawing target of the second target drawing command.

In some implementations, a drawing parameter includes one or more of the following parameters: vertex information of a drawing model, color information, and/or rendering material information. The same drawing command indicates that one or more drawing parameters are the same.

In some implementations, the CPU may replace a repeated drawing command with a target indication command, and send a first image command stream obtained after the replacement to the graphics processing unit. In some other implementations, the CPU deletes the repeated drawing command, and sends, to the GPU, the first image command stream from which the repeated drawing command is deleted and the target indication command separately. The repeated drawing command in the first image command stream may be replaced with a no-operation command or may be replaced with a jump command, where the jump command is used to instruct the GPU to jump to the target indication command. The target indication command herein is used to instruct the graphics processing unit to obtain the reusable drawing target. In this way, the graphics processing unit may render the image frame based on the reusable drawing target, and does not need to perform an operation of generating the drawing target, thereby reducing power consumption of the graphics processing unit.

It should be understood that the CPU may replace or delete all same drawing commands, or select a part of same drawing commands for replacement or deletion. Therefore, the foregoing "repeated drawing command" includes one or more drawing commands in the first target drawing command.

In some implementations, the drawing command may further carry storage indication information. The storage indication information is used to indicate a storage location of a corresponding drawing target. Therefore, the CPU may obtain a storage location of the reusable drawing target by using storage indication information of the second target drawing command. The target indication command includes a storage address of the reusable drawing target. After receiving the target indication command, the graphics processing unit may obtain the reusable drawing target from the storage location indicated by the storage address.

In some implementations, the drawing command may further carry an identifier of a to-be-generated drawing target. Therefore, the CPU may obtain an identifier of each drawing target; and instruct, by using the target indication command, the graphics processing unit to obtain the reusable drawing target indicated by a specified drawing target identifier. For example, the target indication command carries the drawing target identifier of the reusable drawing target. After receiving the target indication command, the graphics processing unit may obtain the corresponding reusable drawing target based on the drawing target identifier. The drawing target identifier is used to uniquely identify the drawing target.

In some implementations, the method further includes: comparing the one or more first drawing commands with one or more second drawing commands in the second image command stream, to determine the first target drawing command (or the second target drawing command).

There are a plurality of specific implementations of a process of comparing the drawing commands. In some implementations, the one or more first drawing commands are classified into logical groups based on a command attribute, and a first drawing command is compared with a drawing command in the second image command stream, where the first drawing command and the drawing command in the second image command stream are in a same logical group. Generally, at least one command attribute of first drawing commands included in a same logical group is the same; and at least one command attribute of first drawing commands included in different logical groups is different. For example, a plurality of first drawing commands are classified into a background logical group A and a character logical group A, and second target drawing commands in the second image command stream are also classified into a background logical group B and a character logical group B in a similar manner. Then, a first drawing command in the background logical group A is compared with a second drawing command in the background logical group B, and a first drawing command in the character logical group A is compared with a second drawing command in the character logical group B. In other words, same commands in a same logical group are the determined first target drawing command and the determined second target drawing command. Because a plurality of drawing targets are generated based on a plurality of first drawing commands that have a same command attribute, the plurality of drawing targets can be combined for rendering in a rendering process. Therefore, one or more first drawing commands are classified into different logical groups, so that drawing targets corresponding to a same logical group can be combined for rendering in a rendering process, to further reduce the load of the graphics processing unit. In addition, if the drawing target needs to be reused in a subsequent image frame, a probability that a rendering error occurs in an image rendering process of the subsequent image frame can also be reduced.

The command attribute includes one or two of the following: a drawing function (for example, a transparent drawing function) used for the drawing command, or vertex information carried in the drawing command and/or a change of the vertex information, where the vertex information is used to identify a drawing model carried in the drawing command.

In some implementations, an implementation process of classifying the one or more first drawing commands into logical groups based on a command attribute may include: when values corresponding to a specified dimension in vertex coordinates included in at least two first drawing commands are equal, classifying all of the at least two first drawing commands into a first logical group, where the vertex coordinates are used to represent the vertex information, and the vertex information is used to identify the drawing model carried in the drawing command; when a transparent drawing function included in the first drawing command is in an enabled state, classifying the first drawing command into a second logical group; and/or when a transparent drawing function included in the first drawing command is in a disabled state, classifying the first drawing command into a third logical group, where command attributes of the first drawing command included in the first logical group, the second logical group, and the third logical group are different.

There are a plurality of specific implementations of a process of comparing the drawing commands. In some other implementations, drawing commands with a same priority are compared in descending order of priorities of the drawing commands, where the priority is used to indicate a possibility that the drawing command is repeated relative to the rendered image frame, and the possibility is positively correlated with the priority. This manner may be used together with the foregoing logical classification manner or used independently. The priority is used to indicate a possibility that the drawing command changes. A lower possibility indicates a higher priority. A drawing command with a higher priority may be preferentially compared, that is, the reusable drawing target can be obtained in advance as much as possible. This improves comparison efficiency. It should be understood that the priority may alternatively be used to indicate a possibility that the drawing command is not repeated. In this case, the possibility is negatively correlated with the priority.

In some implementations, the priority may be determined in the following manner: The priority of the drawing command is determined based on a case in which the drawing model is carried in the drawing command. The drawing model may be understood as a basic model of a drawing target that is generated based on the drawing command. For example, if the drawing model is a basic morphological model of a character, after running the drawing command, the GPU displays, based on the basic morphological model, an image of the character that is in a covered state. In this implementation, the drawing command carries drawing model information (for example, vertex coordinates) of a drawing target, and the drawing model information is used to indicate a drawing model based on which the drawing target is generated. A target parameter of the drawing target generated based on the drawing command may be estimated based on the drawing model information or the like in the drawing command, and the priority of the drawing command is determined based on the target parameter. In some implementations, the priority is positively correlated with the target parameter. For example, when the target parameter is greater than or equal to a specified parameter threshold, the priority of the drawing command is set to a highest priority. When the target parameter is less than a specified parameter threshold, the priority of the drawing command is set to a lowest priority. The target parameter may be a parameter such as a surface area of a generated 2D graph or power consumption of generating the drawing target.

In some other implementations, the priority may be determined in the following manner: A priority of a drawing command that carries marked target drawing model information is set to a highest priority, and a priority of a drawing command that does not carry the target drawing model information is set to a lowest priority. The target drawing model information is used to indicate a marked drawing model. Some drawing models that are less likely to change or do not change greatly are marked in advance, so that drawing commands that carry information corresponding to the drawing models may be preferentially compared.

In some other implementations, the priority may be determined in the following manner: A specified drawing model is determined in a drawing model library in advance based on an actual requirement; and when the priority of the drawing command is to be determined, a priority of a drawing command that carries drawing model information of the specified drawing model may be set to a highest priority, and a priority of a drawing command that does not carry the drawing model information of the specified drawing model to a lowest priority. The specified drawing model may be a drawing model whose area is greater than or equal to a specified area threshold, or may be a drawing model in which estimated power consumption of generating a drawing target based on the drawing model is greater than or equal to a specified power consumption threshold, or may be a drawing model specified based on experience.

It should be noted that a drawing command in the to-be-rendered image frame is compared with a drawing command in the rendered image frame. In this case, priorities of the drawing commands in the two frames are usually determined in a same manner or the drawing commands in the two frames are usually classified into logical groups in a same manner. The drawing command in the rendered image frame may be classified into a logical group previously or when the to-be-rendered image frame is processed, or the priority of the drawing command in the rendered image frame may be determined previously or when the to-be-rendered image frame is processed. The drawing command in the to-be-rendered image frame is not necessarily classified into a logical group when the drawing commands are compared, or the priority of the drawing command in the to-be-rendered image frame is not necessarily determined when the drawing commands are compared. If possible, the drawing command in the to-be-rendered image frame may alternatively be classified into a logical group earlier, or the priority of the drawing command in the to-be-rendered image frame may alternatively be determined earlier.

In some implementations, a rule for classifying the drawing command into a logical group or a rule for determining the priority of the drawing command may be preconfigured. The rule is based on intelligent analysis of historical drawing commands. Analysis methods include big data analysis algorithms, various classification algorithms, machine learning algorithms, or the like. For example, if drawing commands with an attribute that are obtained through historical analysis are always repeated in a current scenario or time period (for example, a background in an image never changes), these commands may be classified into a same logical group, where the logical group may also be considered as a static command group (or referred to as a static group); and a drawing target of the static command group is stored. Similarly, if some other drawing commands with a feature are never repeated, these drawing commands may be classified into a same logical group, where the logical group may also be considered as a dynamic command group (or referred to as a dynamic group).

In some implementations, the method further includes: when a repeated drawing command is determined but a current priority of the repeated drawing command is not the highest, setting the priority of the repeated drawing command to be the highest. In this way, when the current to-be-rendered image frame is used as a "rendered image frame" subsequently, the repeated drawing command may be preferentially compared.

In some implementations, the method may further include: obtaining a process identifier of a process to which the first image frame belongs; and correspondingly, an implementation process of obtaining the first image command stream of the first image frame may include: when the process identifier is recorded in a target process list, obtaining the first image command stream, where the target process list records a process identifier of at least one optimizable process. In some implementations, the optimizable process may be a process in which process power consumption severely causes overheat. For example, historical average power consumption of a process may be obtained based on a historical power consumption status of the process. When historical average power consumption of a process is greater than a specified power consumption threshold, the process is determined as an optimizable process. Alternatively, when an image frame includes a drawing model whose area is greater than a specified area threshold, the image frame is determined as an optimizable process. The optimizable process is marked in advance, so that execution of the method can be more targeted, and efficiency is also higher.

In some implementations, the rendered image frame is an image frame adjacent to the image frame in a time sequence in image frames that have been rendered. To be specific, the rendered image frame may be a previous-frame image of the image frame. In a plurality of image frames that have been rendered, the previous-frame image is an image frame with a highest probability that image content is similar to image content of the image frame in the plurality of image frames. Therefore, when the rendered image frame is the previous-frame image, in comparison with another image frame that has been rendered, there is a largest probability that the drawing command in the second image command stream of the previous-frame image is the same as the drawing command in the first image command stream. In a subsequent image rendering process, a drawing target in the previous-frame image can be used more frequently to perform image rendering on the image frame, so that the load of the graphics processing unit can be greatly reduced.

In some implementations, the method further includes: monitoring image command streams of two consecutive image frames. The image command streams of two consecutive image frames are monitored, to compare commands in an image command stream of a current to-be-rendered image frame and an image command stream of a previous image frame. In addition, a logical group or a priority of a drawing command can be adjusted in real time by monitoring the image command streams of two consecutive image frames. For example, it is learned through historical data statistics that an initial group of a drawing command is a static group, but it is found through monitoring that the drawing command is no longer repeated in a next image frame. In this case, the drawing command may be adjusted from the static group to a dynamic group.

According to a second aspect, an example embodiment of this application provides an image rendering apparatus. The apparatus includes one or more modules, and the one or more modules are configured to implement any image rendering method in the first aspect.

According to a third aspect, an embodiment of this application provides an electronic device, for example, a terminal. The electronic device includes a processor and a memory. The processor usually includes a CPU and a GPU. The memory is configured to store a computer program. When the CPU is configured to execute the computer program stored in the memory, any image rendering method in the first aspect is implemented. The GPU is configured to: receive a command sent by the CPU, and perform image rendering based on the command. The two types of processors may be two chips, or may be integrated onto a same chip.

According to a fourth aspect, an embodiment of this application provides a storage medium, where the storage medium may be non-volatile. The storage medium stores a computer program, and when the computer program is executed by a processor, the processor is enabled to implement any image rendering method in the first aspect.

According to a fifth aspect, an embodiment of this application provides a computer program or a computer program product, where the computer program or the computer program product includes computer-readable instructions. When the computer program or the computer program product is run on a computer, the computer is enabled to perform any image rendering method in the first aspect. The computer program product may include one or more program units, configured to implement the foregoing method.

According to a sixth aspect, this application provides a chip, for example, a CPU. The chip includes a logic circuit, and the logic circuit may be a programmable logic circuit. When running, the chip is configured to implement any image rendering method in the first aspect.

According to a seventh aspect, this application provides a chip, for example, a CPU. The chip includes one or more physical cores and a storage medium. After reading computer instructions in the storage medium, the one or more physical cores implement any image rendering method in the first aspect.

According to an eighth aspect, this application provides an image rendering method. The method may be performed by a GPU (which may also be referred to as a second processor). The method includes: receiving an image command stream sent by a first processor (for example, a CPU), where the image command stream includes one or more drawing commands, and generally, each drawing command carries a drawing parameter used to generate a drawing target; and rendering the image frame based on the one or more drawing commands and a reusable drawing target. The reusable drawing target is obtained by the second processor from a storage apparatus based on the image command stream sent by the first processor or a target indication command. In the conventional technology, the GPU needs to generate all drawing targets. However, by using the method provided in this application, the GPU does not need to generate the reusable drawing target, and only needs to obtain the reusable drawing target from the storage apparatus, thereby reducing load caused by "generation", and reducing load of the GPU.

According to a ninth aspect, this application provides an image rendering apparatus. The apparatus includes one or more units, configured to implement the method provided in the eighth aspect.

According to a tenth aspect, this application provides a chip, for example, a GPU. The chip includes one or more physical cores and a storage medium. After reading computer instructions in the storage medium, the one or more physical cores implement the image rendering method in the eighth aspect.

According to an eleventh aspect, this application provides a chip, for example, a GPU. The chip includes a logic circuit, and the logic circuit may be a programmable logic circuit. When running, the chip is configured to implement the image rendering method in the eighth aspect.

In conclusion, in comparison with a related technology, according to the image rendering method provided in this application, the graphics processing unit can directly use the generated reusable drawing target, thereby reducing power consumption of generating the drawing target, effectively reducing load and power consumption of the graphics processing unit, and further reducing power consumption of an entire image rendering process.

In addition, this application further achieves effects mentioned in the foregoing aspects and other technical effects that can be derived. Details are not described herein again.

DESCRIPTION OF EMBODIMENTS

Figure 1:
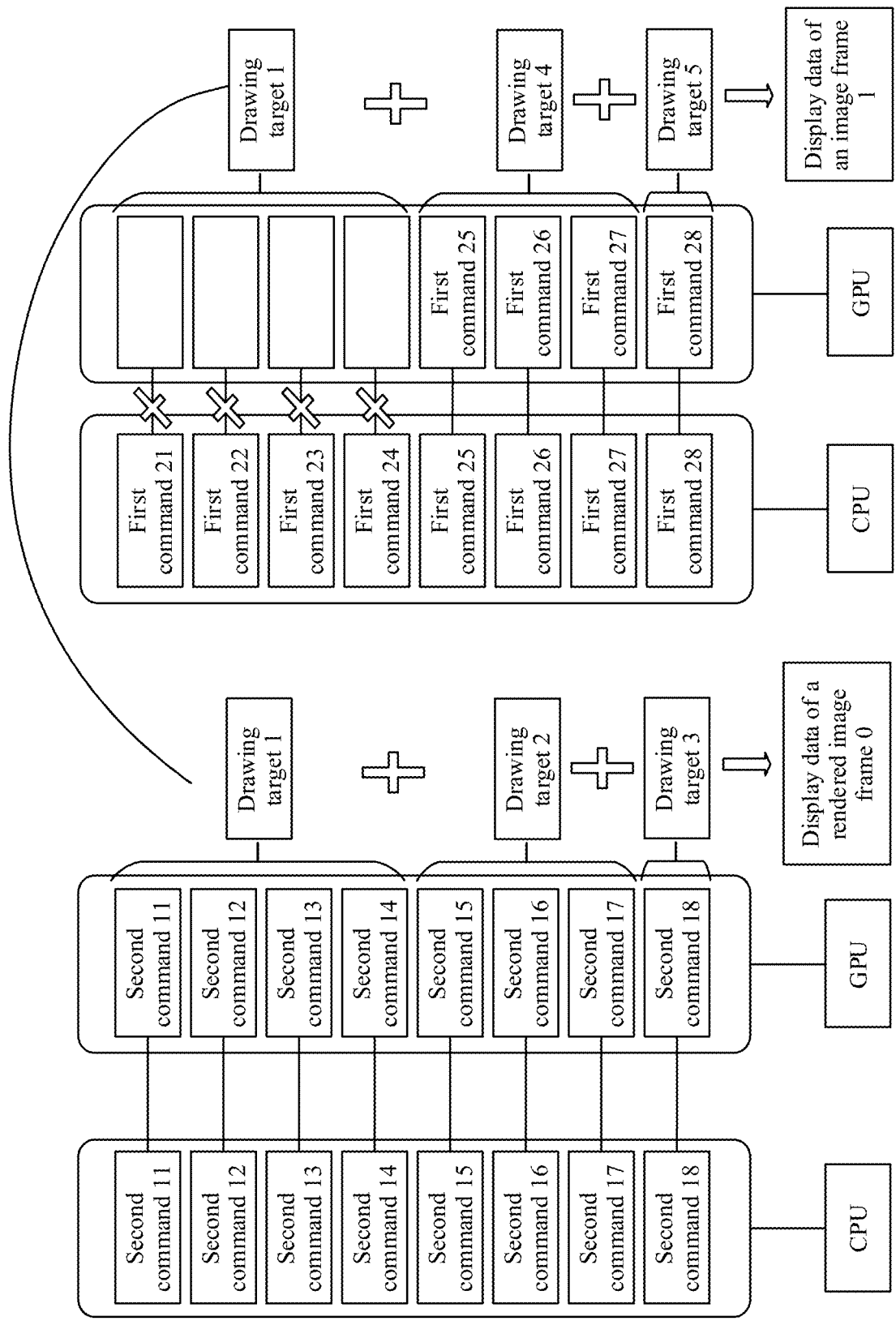
FIG. 1 is a schematic principle diagram of an image rendering method according to this application.

To make the objectives, technical solutions, and advantages of this application clearer, the following further describes the implementations of this application in detail with reference to the accompanying drawings.

For ease of understanding, the following first explains terms in the embodiments of this application.

Unless otherwise specified, "a plurality of" in this application means two or more or "at least two". "A and/or B" in this application includes at least three cases: "A", "B", and "A and B".

A command stream refers to a command set including one or more computer-readable commands. In some implementations, a command may include information such as a command name (or referred to as a function name) and a parameter, and the command name may also be considered as a type of "parameter". In some implementations, a command may be further split into more commands. For example, after a command is internally expanded, a plurality of functions are called in essence, and each function has its own parameter. In this case, a parameter of the command includes an internal function name and a parameter of the function. There are a plurality of computer systems and program languages. Therefore, there are a plurality of forms of commands. A specific form of a command is not limited in this application.

In this application, "same commands" usually indicate that results obtained after the commands are executed are the same. For example, drawing targets generated after the drawing commands are executed are the same. However, this application does not limit that "the same" is indistinguishable. In some embodiments, "the same" may alternatively be "approximate" or "similar". For example, a character appearing in two consecutive frames of a game picture has a slight difference, and the difference may not be displayed. In this case, the character in a previous frame may be reused in a next frame, and drawing commands for generating the character may also be considered as the same. When command names exist, the command names usually also need to be the same. For example, if a drawing command includes application programing interface (application program interface, API) call, names of called functions are the same. From another perspective, the same commands indicate that parameters included in the commands are the same.

An image command stream (or referred to as a graphic command stream (graphic command stream)) includes one or more drawing commands. A GPU obtains display data of the image frame by running the drawing command in the image command stream, so that a display displays an image based on the display data.

A drawing command is a command used to draw (also referred to as generate) a drawing target in an image frame, for example, a draw call (draw call) of an open graphics library (open graphics library, OpenGL) (that is, a command used by a CPU to call an underlying graphics drawing interface). Optionally, the drawing target may be represented by using data stored in memory. Correspondingly, a set of drawing targets generated based on the image command stream may constitute display data of a corresponding graphics frame. For example, assuming that an image frame includes a character A and a character B, an image command stream of the image frame may include one or more drawing commands used to generate a drawing target of the character A, and one or more drawing commands used to generate a drawing target of the character B. Correspondingly, the GPU can obtain display data of the image frame by running these drawing commands. In the OpenGL, the drawing command is also referred to as a rendering command, and the drawing target is also referred to as a rendering target. In this application, the OpenGL is used as an example to describe an implementation method. However, this application is not limited to the OpenGL, and may also be applied to another type of graphics library. The drawing command carries a drawing parameter. This drawing parameter is used to generate a drawing target. Further, the drawing command may further carry drawing model information, and the drawing model information is used to indicate a drawing model based on which the drawing target is generated. By running the drawing command, the GPU can generate a drawing target, where the drawing target uses the drawing model as a basic shape and a shape feature meets the drawing parameter.

For example, the drawing command carries drawing model information of the drawing model that is a front-standing King Arthur (the King Arthur is a role in a game), carries a drawing parameter that is used to indicate that the drawing model is to be turned to the left as a whole by 30 degrees, and carries parameter information that indicates lighting, a material, and the like of the King Arthur in the image frame. After running the drawing command, the GPU may obtain image data representing that the King Arthur is turned to the left as a whole by 30 degrees and the information such as lighting, a material, and the like is added.

The "drawing command" in this application may be one command, for example, one API call function; or may be a set of a plurality of commands, for example, in the open GL, one draw call usually includes a plurality of API call functions, and the one draw call may be considered as one drawing command used to complete drawing once. One draw call may draw one drawing target, a plurality of draw calls may draw one drawing target, or one draw call may draw a plurality of drawing targets. How to classify a drawing target is not limited in this application. For example, a house is an indivisible drawing target, or a house is a drawing target, but the drawing target includes two drawing targets: a roof and a wall.

A drawing model is an object that objectively describes a form and/or structure and that is constituted by a physical or virtual representation. A shape of the drawing model and a shape of the drawing target each may be represented by a discrete lattice having a relative location relationship. The discrete lattice may include at least one point, and each point in the discrete lattice may be referred to as a vertex. A location of the vertex may be represented by vertex information. In other words, both the drawing model and the drawing target may be identified by vertex information. The vertex information may include information such as vertex coordinates. For example, the drawing model of the King Arthur refers to an object represented by using a plurality of vertices that have a relative location relationship. In this case, location information of each vertex may be three-dimensional coordinates of the vertex.

A terminal may implement various functions by installing different application software. When the terminal provides diversified functions, how to improve user experience on the terminal is an urgent problem to be resolved by each terminal vendor. Especially for a mobile terminal, power consumption and overheat of the terminal are important factors that affect user experience. Load of the GPU is one of factors that affect power consumption and overheat. For example, when the load of the GPU is relatively high, a running frequency of the GPU is relatively high. This causes problems of overheat and fast power consumption of the mobile terminal, and consequently, user experience is relatively poor.

The GPU is mainly responsible for image operation work on the terminal, and the load of the GPU is mainly load in a rendering process performed by the GPU. In a related technology, the following method is mainly used to process an image rendering process, to reduce the load of the GPU.

For example, a rendering technology based on levels of detail (levels of detail, LOD) may be used to process the rendering process. In this technology, a rendering resource for rendering each object model may be allocated based on a location and an importance degree of the object model in a to-be-rendered image frame in a display environment, to reduce rendering load of the GPU. For example, when the importance degree of the object model in the display environment is relatively low, for example, when the object model is far away, a quantity of vertices used to represent the object model may be reduced, to reduce rendering details of an unimportant distant object. This achieves an objective of reducing the rendering load. However, reducing the rendering details may cause deterioration of image quality. In addition, because each level of detail needs to occupy memory space, memory usage in the technology is relatively high. In addition, in the rendering technology, in an entire rendering process of an image frame, a CPU needs to be first used to obtain and compare locations and importance degrees of all object models, and then allocate rendering resources based on the locations and the importance degrees. Consequently, a computation amount of the CPU increases.

For another example, an early-Z culling (early-Z culling, Early-Z) technology may be used to process the rendering process. In this technology, before a fragment is shaded, a depth of the fragment is detected, to determine whether the fragment is covered by another fragment. If the fragment is covered by another fragment, the fragment is not shaded, to reduce rendering load. However, this technology cannot be used in a scenario in which a fragment needs to be discarded, depth information of a fragment needs to be changed, or transparent drawing needs to be performed. In other words, an application scope of this technology is relatively narrow. A graph formed by a plurality of vertices in an object model based on a specified connection relationship is referred to as a fragment (fragment), and the fragment has feature information such as a color, a depth, and a texture.

For another example, a tile-based rendering (tile-based rendering) technology may be used to process the rendering process. In this technology, an image is segmented into several tiles, each tile is separately rendered, and after rendering of each tile ends, content (for example, a color or a depth) of the tile is compared with content of a tile stored in an external memory (external memory). When the content of the tile is inconsistent with the content of the tile stored in the external memory, the content of the tile is written into the external memory. When the content of the tile is consistent with the content of the tile stored in the external memory, the content of the tile does not need to be written into the external memory, to achieve an objective of reducing storage bandwidth. However, because a comparison process in this technology is performed after the rendering process, that is, the rendering process still needs to be performed on each tile in this technology, the load of the GPU is still relatively high.

This application provides an image rendering method. Before sending an image command stream to a GPU, a CPU optimizes the image command stream, and sends an optimized command stream to the GPU, to reduce load of executing the command stream by the GPU. Specifically, the CPU obtains a first image command stream of a to-be-rendered image frame, and compares a drawing command in the first image command stream with a drawing command in a second image command stream of a rendered image frame. When a same drawing command exists, the CPU optimizes the first image command stream, and sends an optimized first image command stream to the GPU, so that the GPU obtains a drawing target that is previously generated based on the same drawing command (for ease of description, the drawing target is referred to as a reusable drawing target below), to perform image rendering on the image frame. The reusable drawing target may be generated when the foregoing rendered image frame is rendered by the GPU, or may be generated earlier.

In comparison with a related technology, according to the method provided in this application, the GPU can directly use the generated reusable drawing target, thereby reducing power consumption of generating the drawing target, reducing load of the GPU, and further reducing power consumption of an entire image rendering process of the image frame.

The image rendering method may be applied to a terminal. When an application running on the terminal needs to perform image rendering, power consumption of the terminal can be reduced by performing the image rendering method provided in this embodiment of this application.

For example, referring to FIG. 1, it is assumed that a second image command stream of a rendered image frame 0 includes a plurality of second drawing commands (which are referred to as second commands in this example): a second command 11 to a second command 18, and the like. After the CPU transmits the second image command stream to the GPU, the GPU generates a drawing target 1 based on second drawing commands including the second command 11 to the second command 14, generates a drawing target 2 based on second drawing commands including the second command 15 to the second command 17, and generates a drawing target 3 based on a second drawing command including the second command 18; and obtains display data of the rendered image frame 0 based on the drawing target 1, the drawing target 2, and the drawing target 3.

A first image command stream of a to-be-rendered image frame 1 includes a plurality of first drawing commands (which are referred to as first commands in this example): a first command 21 to a first command 28, and the like. After the first commands in the first image command stream are compared with the second commands in the second image command stream, it may be determined that the first command 21 to the first command 24 are correspondingly the same as the second command 11 to the second command 14, that is, the drawing target 1 is a reusable drawing target. In this case, the CPU may instruct the GPU to generate a drawing target 4 based on the first command 25 to the first command 27, generate a drawing target 5 based on the first command 28, and then obtain display data of the image frame 1 based on the drawing target 4, the drawing target 5, and the pre-generated drawing target 1. In this process, because the GPU does not need to generate the drawing target 1 based on the first command 21 to the first command 24, power consumption of the GPU can be reduced.

Figure 2:
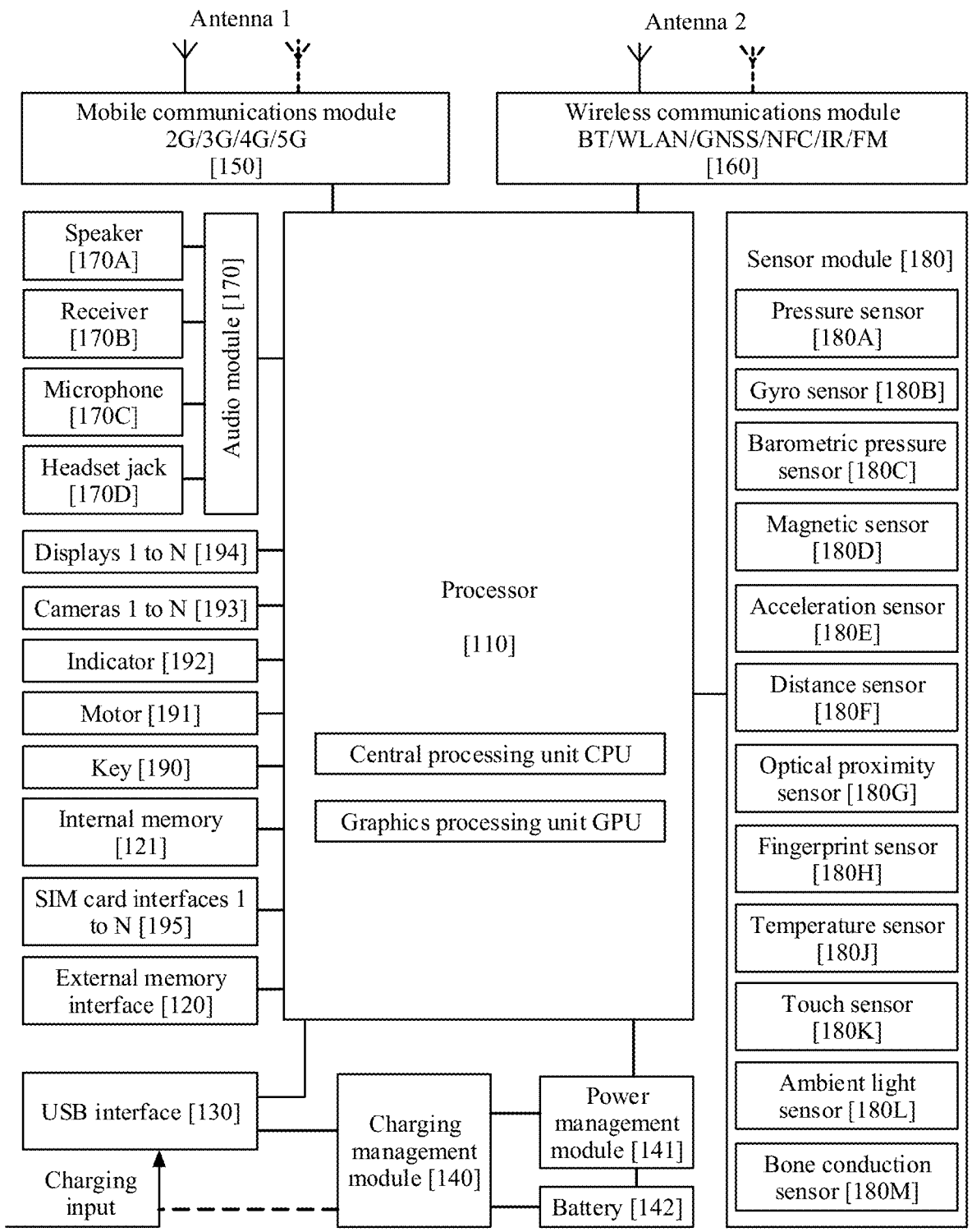
FIG. 2 is a schematic structural diagram of an electronic device according to this application.

FIG. 2 is a schematic structural diagram of an electronic device 100 in the image rendering method. The electronic device 100 may be but is not limited to a laptop computer, a desktop computer, a mobile phone, a smartphone, a tablet computer, a multimedia player, an e-reader, a smart vehicle-mounted device, a smart household appliance, an artificial intelligence device, a wearable device, an internet of things device, a virtual reality device/an augmented reality device/a hybrid reality device, or the like.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner (for example, a bus connection manner) that is different from that in the foregoing embodiment, or a combination of a plurality of interface connection manners.

The processor 110 may include one or more processing units, for example, include a central processing unit CPU (for example, an application processor (application processor, AP)) and a graphics processing unit (graphics processing unit, GPU). Further, the processor 110 may further include a modem processor, an image signal processor (image signal processor, ISP), a microcontroller unit (microcontroller unit, MCU), a video codec, a digital signal processor (digital signal processor, DSP), a baseband processor, a neural network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset for playing audio by using a headset. Alternatively, the interface may be configured to connect to another electronic device, for example, an AR device.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G/3G/4G/5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmits the electromagnetic wave to the modem processor for demodulation. The mobile communications module 150 may further amplify a signal modulated by the modem processor, and convert an amplified signal into an electromagnetic wave for radiation through the antenna 1. In some embodiments, at least a part of function modules in the mobile communications module 150 may be disposed in the processor 110. In some embodiments, at least a part of function modules in the mobile communications module 150 may be disposed in a same device as at least a part of modules in the processor 110.

The modem processor may include a modulator and a demodulator. The modulator is configured to modulate a to-be-sent low-frequency baseband signal into an intermediate signal or a high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide wireless communication solutions that are applied to the electronic device 100, and that include a wireless local area network (wireless local area networks, WLAN) (for example, a wireless fidelity (wireless fidelity, Wi-Fi) network), Bluetooth (Bluetooth, BT), a global navigational satellite system (global navigation satellite system, GNSS), frequency modulation (frequency modulation, FM), a near field communication (near field communication, NFC) technology, an infrared (infrared, IR) technology, and the like. The wireless communications module 160 may be one or more devices integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, that is, converting the electrical signal into a visible image. The ISP may further perform algorithm optimization on noise, brightness, and complexion of the image. The ISP may further optimize parameters such as exposure and color temperature of a photographing scene. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process other digital signals in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, voice recognition, and text understanding, may be implemented through the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application program required by at least one function (for example, a voice playing function or an image playing function), and the like. The data storage area may store data (for example, audio data and a phone book) created in a process of using the electronic device 100, and the like. In addition, the internal memory 121 may include a high-speed random access memory, for example, a double data rate synchronous dynamic random access memory (double data rate synchronous dynamic random access memory, DDR), and may alternatively include a non-volatile memory, for example, at least one magnetic disk storage device, a flash memory device, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement audio functions, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or a part of function modules of the audio module 170 are disposed in the processor 110.

The speaker 170A, also referred to as a "loudspeaker", is configured to convert an electrical audio signal into a sound signal. The electronic device 100 may be configured to listen to music or answer a call in a hands-free mode by using the speaker 170A.

The receiver 170B, also referred to as an "earpiece", is configured to convert an electrical audio signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further recognize a sound source, to implement a directional recording function, and the like.

The headsetjack 170D is configured to connect to a wired headset. The headsetjack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure strength based on a capacitance change. When a touch operation is performed on the display 194, the electronic device 100 detects strength of the touch operation by using the pressure sensor 180A. The electronic device 100 may also calculate a touch location based on a detection signal of the pressure sensor 180A. In some embodiments, touch operations that are performed in a same touch location but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on an SMS message application icon, an instruction for creating a new SMS message is executed.

The gyro sensor 180B may be configured to determine a motion posture of the electronic device 100. In some embodiments, an angular velocity of the electronic device 100 around three axes (namely, axes x, y, and z) may be determined by using the gyroscope sensor 180B. The gyro sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, and allows the lens to eliminate the shake of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the clamshell is set based on a detected opening or closing state of the flip cover or a detected opening or closing state of the clamshell.

The acceleration sensor 180E may detect accelerations in various directions (usually on three axes) of the electronic device 100, and may detect magnitude and a direction of gravity when the electronic device 100 is still. The acceleration sensor 180E may be further configured to recognize a posture of the electronic device, and is applied to an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off a screen to save power. The optical proximity sensor 180G may be further configured to automatically lock and unlock the screen in a smart cover mode or a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142, to avoid abnormal shutdown due to a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

In some other embodiments of this application, the electronic device 100 may alternatively use an interface connection manner that is different from that in the foregoing embodiment. For example, a part or all of the foregoing plurality of sensors are connected to the MCU, and then connected to the AP through the MCU.

The key 190 includes a power key, a volume key, or the like. The key 190 may be a mechanical button, or may be a touch key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may have a same type or different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with the layered architecture is used as an example to illustrate a software structure of the electronic device 100.

Figure 3:
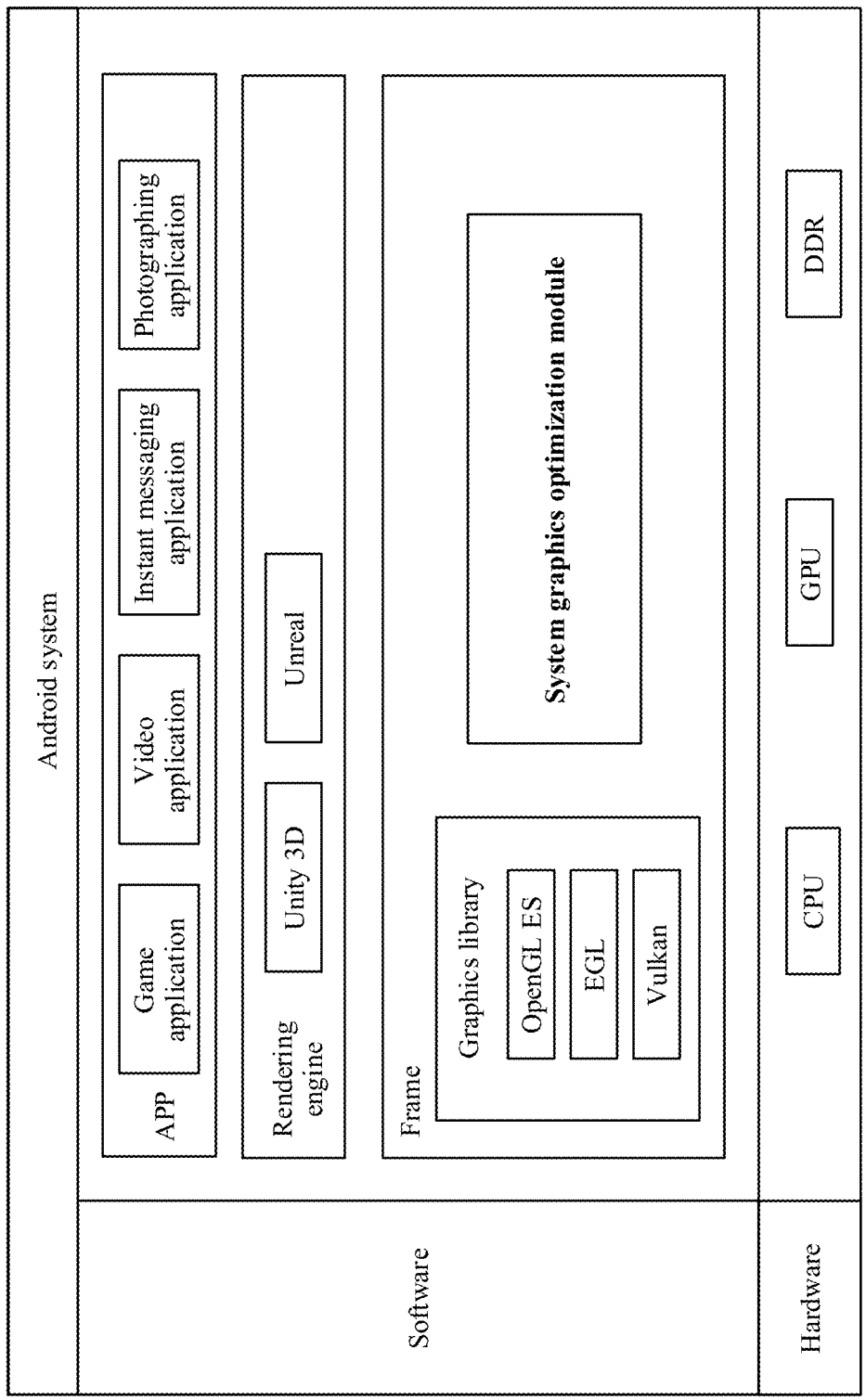
FIG. 3 and FIG. 4 are schematic structural diagrams of a plurality of modules in an electronic device according to this application.
Figure 4:
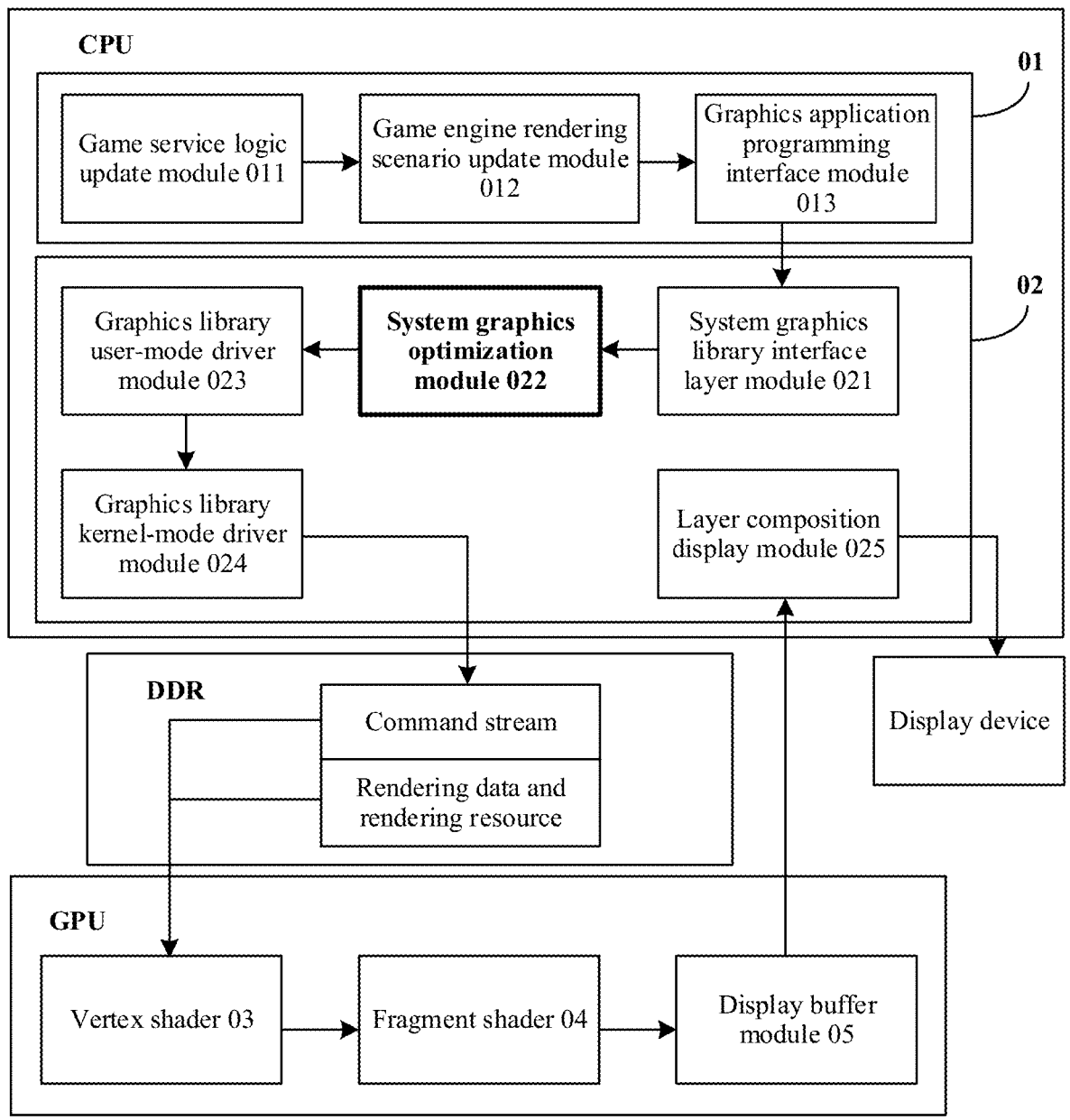

FIG. 3 and FIG. 4 further show a form of a solution provided in an embodiment with reference to software and some hardware. As shown in FIG. 3, an electronic device 100 includes hardware, and the hardware includes a CPU, a GPU, a DDR, and the like. For a structure of the electronic device 100, refer to FIG. 2. Details are not described herein again.

It should be understood that the software and the hardware shown in FIG. 3 and FIG. 4 are merely examples. In another embodiment, another type of software or hardware may be used. For example, in FIG. 3 and FIG. 4, the DDR is used as a video RAM. In another embodiment, the video RAM may alternatively be a synchronous dynamic random access memory (synchronous dynamic random-access memory, SDRAM), or another type of memory.

The software includes applications (APP), a rendering engine, and a framework (framework). The applications include a game application, a video application, an instant messaging application, a photographing application, and the like. The rendering engine includes one or more engines, for example, a rendering engine such as Unity 3D/Unreal. The framework includes various graphics libraries, such as an embedded open graphics library (open graphics library for embedded system, OpenGL ES), an EGL (a layer interface between a graphics rendering API and a local platform window system), or a Vulkan (a cross-platform drawing application programing interface). Further, the solution provided in this embodiment may be set in the framework and presented as a system graphics optimization module. After being executed, the system graphics optimization module is configured to implement the solution provided in this embodiment. Specifically, the system graphics optimization module is configured to obtain and optimize a graphics command stream, and send an optimized graphics command stream to the GPU.

In this embodiment, an application layer module and a system layer module are run on the CPU. The application layer module is configured to: generate an image command stream based on an application requirement, and send the image command stream to the system layer module. The system layer module may optimize a drawing command in the image command stream according to the image rendering method provided in this application, and then send an optimized image command stream to the GPU, so that the GPU obtains a reusable drawing target and generates another drawing target based on the optimized image command stream, then shades the reusable drawing target and the another generated drawing target based on the drawing command, generates display data based on the shaded drawing targets, and then sends the display data to the CPU, and the CPU controls a display device to display an image based on the display data.

In this embodiment, a game application including a game such as PlayerUnknown's Battlegrounds, Fortnite, or Arena of Valor, or a game application of a virtual reality or augmented reality type is used as an example. As shown in FIG. 4, when a game application runs on a terminal, the application layer module is a game layer module. The game layer module 01 may include a game service logic update module 011, a game engine rendering scenario update module 012, and a graphics application programming interface module 013 (for example, an OpenGL ES renderer module). The system layer module 02 may include a system graphics library interface layer module 021 (for example, a system GLES interface layer), a system graphics optimization module 022, a graphics library user-mode driver module 023 (for example, a GLES user-mode driver module), a graphics library kernel-mode driver module 024 (for example, a GLES kernel-mode driver module), and a layer composition display module 025. A vertex shader (vertex shader, VS) 03, a fragment shader (fragment shader, FS) 04, and a display buffer module 05 may be configured on the GPU. The game service logic update module 011, the game engine rendering scenario update module 012, and the graphics application programming interface module 013 are configured to: convert logic of a game into an image command stream, and send the image command stream to the system graphics optimization module 022 by using the system graphics library interface layer module 021. The system graphics optimization module 022 may optimize a drawing command in the image command stream according to the image rendering method provided in this application, and send an optimized image command stream to the DDR by using the graphics library user-mode driver module 023 and the graphics library kernel-mode driver module 024. The DDR stores rendering data and a rendering resource that are required for rendering. The DDR may send the optimized image command stream, and the rendering data and the rendering resource that are required for rendering to the vertex shader 03 on the GPU. The vertex shader 03 may process, based on information received from the DDR, vertex information in the information, and send processed data to the fragment shader 04, to generate each fragment of the image frame, that is, complete an entire rendering process of the image frame. Data processed by the fragment shader 04 may be sent to the display buffer module 05, to generate display data of the image frame. The display buffer module 05 may send the display data to the layer composition display module 025 on the CPU, and the display device may display an image based on the display data processed by the layer composition display module 025.

It should be understood that a part of the modules in FIG. 4 may be implemented by software, and an essence is that the CPU or the GPU reads and runs a software program in a storage medium. A part of the modules may be implemented by hardware, or may be implemented by a combination of software and hardware.

Figure 5:
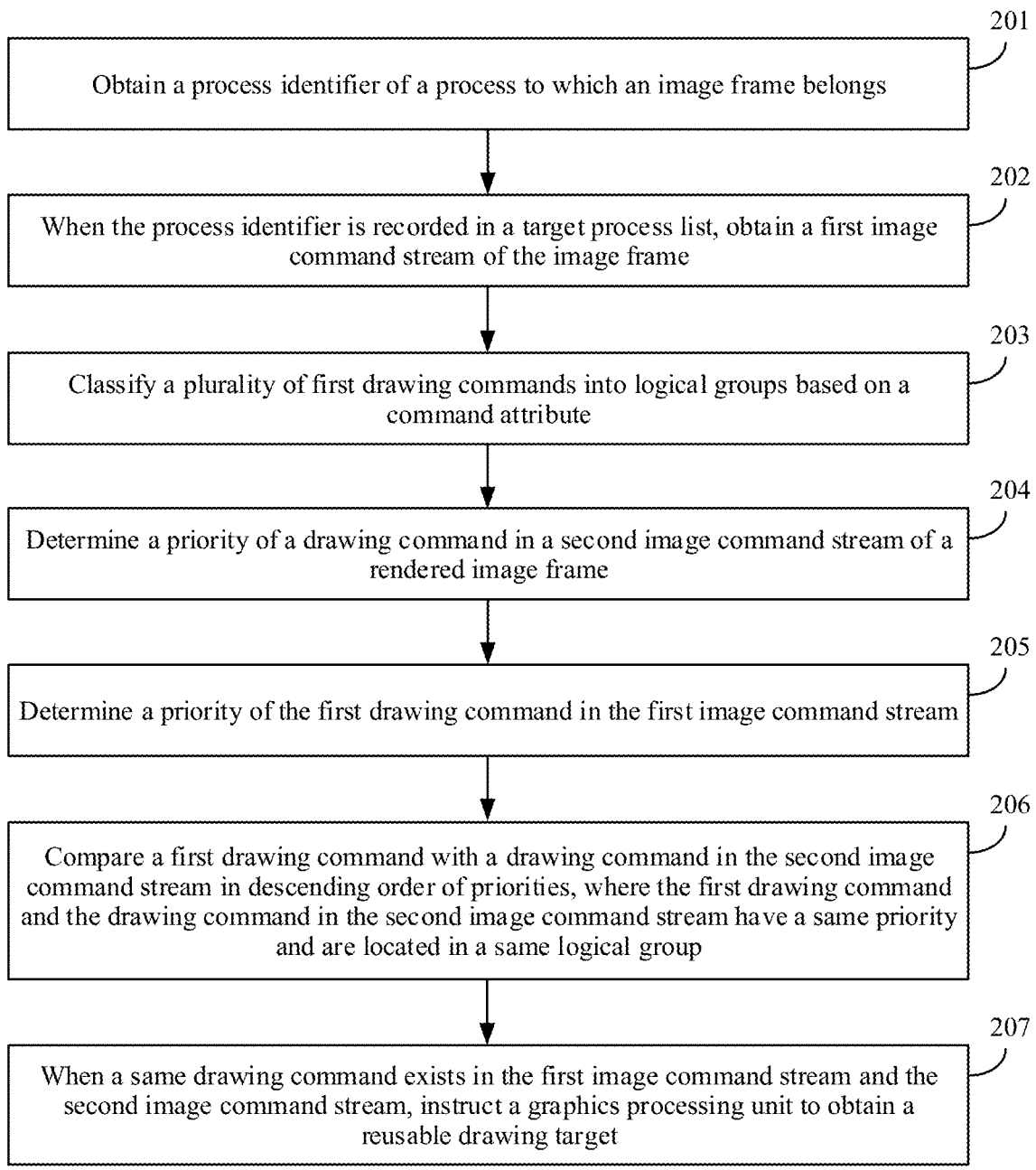
FIG. 5 is a flowchart of an image rendering method according to this application.

The following describes in detail steps of the image rendering method provided in the embodiments with reference to FIG. 5 to FIG. 12. A main part of the image rendering method may be considered as a function of the system graphics optimization module 022 in FIG. 4. As shown in FIG. 5, the image rendering method includes the following steps.

Step 201: A CPU obtains a process identifier of a process to which an image frame belongs.

When an application runs on an electronic device, a graphics library on the electronic device may be used to render the image frame. In addition, before the graphics library is used, a running environment of the graphics library needs to be initialized. In the initialization process, the process identifier of the process to which the image frame belongs may be obtained, and the process identifier is compared with a specified target process list. When the process identifier is recorded in the target process list, it may be determined that the process is an optimizable process. In this case, a first image command stream of the image frame may be obtained, that is, step 202 is performed, to optimize the first image command stream of the process by using the image rendering method provided in this embodiment, to reduce load of a GPU.

The target process list records a process identifier of at least one optimizable process, and the optimizable process may be a process in which process power consumption severely causes overheat. Specifically, the optimizable process that is recorded in the target process list may be determined based on an actual requirement. For example, historical average power consumption of a process may be obtained based on a historical power consumption status of the process. When historical average power consumption of a process is greater than a specified power consumption threshold, the process is determined as an optimizable process. Alternatively, when an image frame includes a drawing model whose area is greater than a specified area threshold, the image frame is determined as an optimizable process.

For example, when the electronic device is a terminal and a system of the terminal is an Android system, an OpenGL ES graphics library of the Android system may be used to render an image frame in a game application, and before the graphics library is used, a running environment of the graphics library is initialized by calling an eglInitialize function (an initialization function). In addition, a hook (hook) function may be added to the eglInitialize function, so that the hook function is used to obtain the process identifier of the process to which the image frame belongs.

When the electronic device is a mobile phone, the CPU herein may be specifically an application processor AP.

Step 202: When the process identifier is recorded in the target process list, the CPU obtains the first image command stream of the image frame.

The first image command stream includes one or more first drawing commands. Each drawing command carries a drawing parameter. Optionally, the drawing parameter may include one or more of the following: vertex information of a drawing model, color information, rendering material information, or the like.

The Android system is still used as an example. The hook function may be added to the initialization function for initializing the running environment of the graphics library. When it is determined that the process identifier of the process to which the image frame belongs is recorded in the target process list, the hook function may be called, to obtain the first image command stream by using the hook function.

Step 203: The CPU classifies the plurality of first drawing commands into logical groups based on a command attribute.

Optionally, when step 203 is performed, for a plurality of drawing commands that have a same command attribute, a same mark may be added to the plurality of drawing commands, or the plurality of drawing commands may be classified into a same array, to classify the plurality of drawing commands into a same logical group. Classification into logical groups enables at least one command attribute of first drawing commands included in a same logical group to be the same, and at least one command attribute of first drawing commands included in different logical groups to be different.

The command attribute may include: a drawing function used for the drawing command, or a change of vertex information carried in the drawing command, or a drawing function used for the drawing command and a change of vertex information. The change of the vertex information refers to a change of the vertex information carried in the drawing command compared with the vertex information carried in another drawing command. The drawing function used for the drawing command refers to a drawing manner used when a drawing target is generated in a process of generating the drawing target. For example, the drawing function may include a transparent drawing function, and the transparent drawing function indicates that the drawing target needs to be drawn in a transparent drawing manner in the process of generating the drawing target.

Correspondingly, an implementation process of classifying the one or more first drawing commands into logical groups based on a command attribute may include one or more of the following cases:

Case 1: When values corresponding to a specified dimension in vertex coordinates included in at least two first drawing commands are equal, all of the at least two first drawing commands are classified into a first logical group.

TABLE 1

| Sequence number of a vertex | Attribute parameter 1 | Attribute parameter 2 | Attribute parameter 3 |
|---|---|---|---|
| . . . | . . . | . . . | . . . |
| 8 | 0.001935125, 0.001953125, 1.0, 1.0 | 1448.0, 608.0 | 255, 255, 255, 255 |
| 9 | 0.22851562, 0.001953125, 1.0, 1.0 | 1525.0, 608.0 | 255, 255, 255, 255 |
| 10 | 0.001953125, 0.22851562, 1.0, 1.0 | 1448.0, 685.0 | 255, 255, 255, 255 |
| 11 | 0.22851562, 0.22851562, 1.0, 1.0 | 1525.0, 685.0 | 255, 255, 255, 255 |
| 12 | 0.001935125, 0.001953125, 1.0, 1.0 | 1323.0, 631.0 | 255, 255, 255, 255 |
| 13 | 0.22851562, 0.001953125, 1.0, 1.0 | 1400.0, 631.0 | 255, 255, 255, 255 |
| 14 | 0.001953125, 0.22851562, 1.0, 1.0 | 1323.0, 708.0 | 255, 255, 255, 255 |
| 15 | 0.22851562, 0.22851562, 1.0, 1.0 | 1400.0, 708.0 | 255, 255, 255, 255 |
| 16 | 0.9667969, 0.9199219, 1.0, 1.0 | 610.0, 624.0 | 255, 255, 255, 255 |
| 17 | 0.9667969, 0.9355469, 1.0, 1.0 | 610.0, 633.0 | 255, 255, 255, 255 |
| 18 | 0.9824219, 0.9199219, 1.0, 1.0 | 619.0, 624.0 | 255, 255, 255, 255 |
| 19 | 0.9824219, 0.9355469, 1.0, 1.0 | 619.0, 633.0 | 255, 255, 255, 255 |
| 20 | 0.9824219, 0.9199219, 1.0, 1.0 | 769.0, 624.0 | 255, 255, 255, 255 |
| 21 | 0.9824219, 0.9355469, 1.0, 1.0 | 769.0, 633.0 | 255, 255, 255, 255 |
| 22 | 0.9980469, 0.9199219, 1.0, 1.0 | 778.0, 624.0 | 255, 255, 255, 255 |
| 23 | 0.9980469, 0.9355469, 1.0, 1.0 | 778.0, 633.0 | 255, 255, 255, 255 |
| 24 | 0.9667969, 0.9355469, 1.0, 1.0 | 610.0, 668.0 | 255, 255, 255, 255 |
| 25 | 0.9824219, 0.9355469, 1.0, 1.0 | 619.0, 668.0 | 255, 255, 255, 255 |
| 26 | 0.9824219, 0.9355469, 1.0, 1.0 | 769.0, 668.0 | 255, 255, 255, 255 |
| 27 | 0.9980469, 0.9355469, 1.0, 1.0 | 778.0, 668.0 | 255, 255, 255, 255 |
| 28 | 0.9667969, 0.9199219, 1.0, 1.0 | 610.0, 677.0 | 255, 255, 255, 255 |
| . . . | . . . | . . . | . . . |

When the values corresponding to the specified dimension in the vertex coordinates included in the at least two first drawing commands are equal, it indicates that changes of vertex information carried in the at least two first drawing commands are the same, and correspondingly, command attributes represented by the changes of the vertex information in the at least two first drawing commands are the same. In this case, all of the at least two first drawing commands may be classified into the first logical group. The specified dimension in the vertex coordinates may be determined based on an actual situation. For example, when the drawing command is used to generate a drawing target constituting a user interface (user interface, UI), because the user interface is generally an image drawn in a two-dimensional plane, and vertex coordinates included in the drawing command are usually three-dimensional coordinates, the three-dimensional coordinates include two-dimensional coordinates and a depth coordinate of the drawing target. Therefore, the specified dimension may be a Z coordinate (that is, the depth coordinate) in the vertex coordinates.

Figure 6:
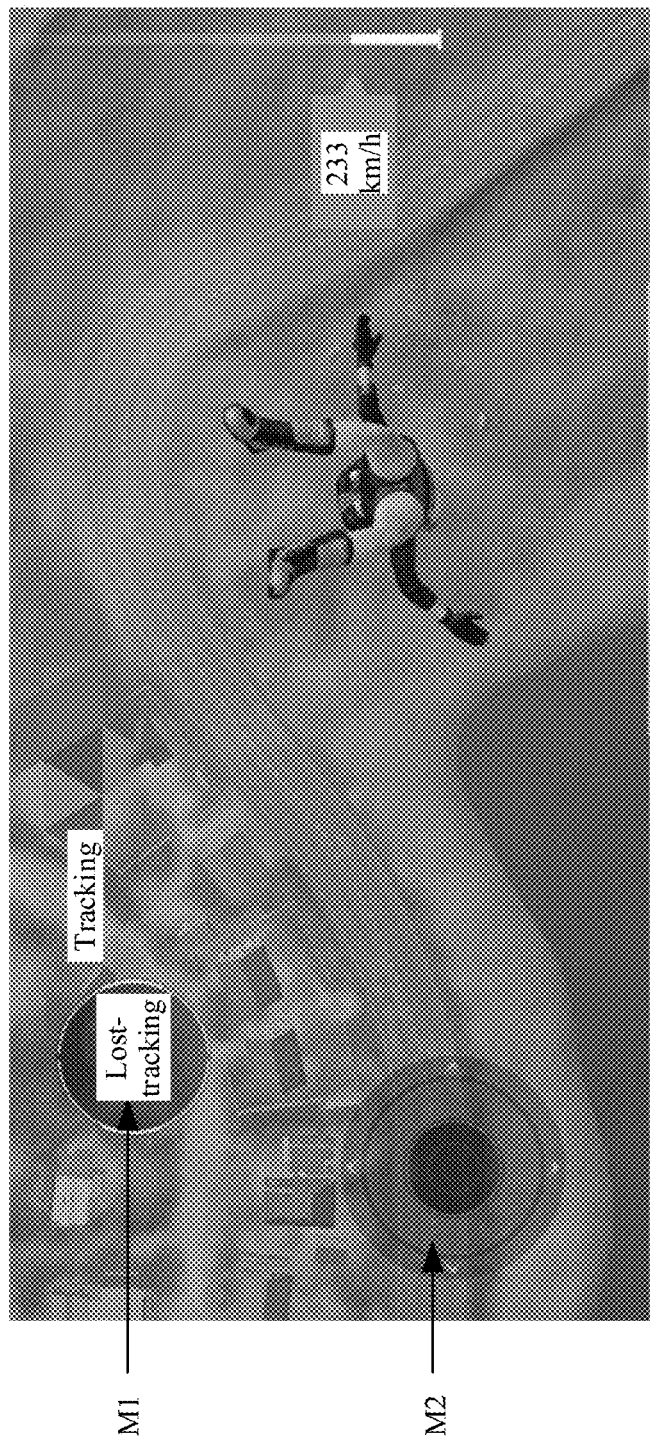
FIG. 6 is a schematic diagram of a game picture of a game according to this application.
Figure 7:
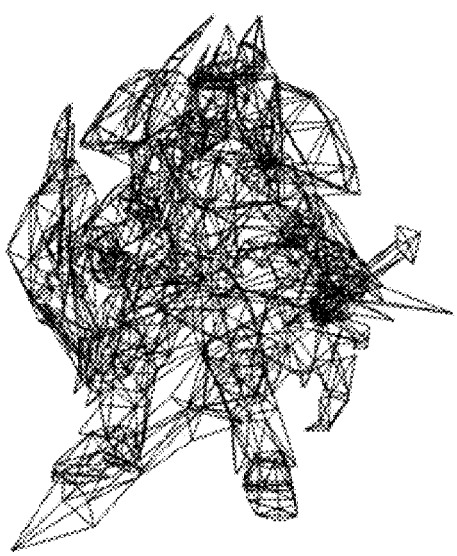
FIG. 7 is a schematic diagram of a rendering model of a game role according to this application.

For example, referring to a schematic diagram of a game picture of a game shown in FIG. 6, both an icon M1 and an icon M2 in FIG. 6 are UI control icons in the user interface, and each UI control icon may be represented by using a plurality of vertices. Table 1 shows partial content of vertex information of vertices corresponding to the UI control icon in FIG. 6. In Table 1, content in the first column from left to right indicates a sequence number of a vertex, and content in the second column indicates an attribute parameter 1 of the vertex. In the attribute parameter 1, a first string of numbers indicates an x coordinate in vertex coordinates, a second string of numbers indicates a y coordinate in the vertex coordinates, a third string of numbers (that is, numbers shown in bold in Table 1) indicates a z coordinate in the vertex coordinates, and a fourth string of numbers indicates a visual field coordinate of the vertex. For example, an x coordinate of a vertex 8 is 0.001935125, a y coordinate of the vertex 8 is 0.001953125, a z coordinate of the vertex 8 is 1.0, and a visual field coordinate of the vertex 8 is 1.0. According to Table 1, it can be seen that z coordinates in vertex coordinates of the vertex 8 to a vertex 28 are all 1.0. Assuming that the specified dimension may be a Z coordinate in the vertex coordinates, drawing commands corresponding to the vertex 8 to the vertex 28 may be all classified into the first logical group. In this case, the first logical group may also be referred to as a UI logical group.

Case 2: When a transparent drawing function included in a first drawing command is in an enabled state, the first drawing command is classified into a second logical group. When a transparent drawing function included in a first drawing command is in a disabled state, the first drawing command is classified into a third logical group.

The transparent drawing function is one of drawing functions. In a GPU rendering process, when a transparent object needs to be rendered, a transparent drawing function of the GPU needs to be set to an enabled state. Therefore, a plurality of first drawing commands may be classified into the second logical group or the third logical group by determining whether the transparent drawing function is in an enabled state. All transparent drawing functions included in first drawing commands in the second logical group are in an enabled state, and all transparent drawing functions included in first drawing commands in the third logical group are in a disabled state.

For example, when the transparent drawing function is used, a blend (blend) function of a switch alpha needs to be set to an enabled state. Therefore, when the switch alpha is in an enabled state and the blend function is in an enabled state, a corresponding first drawing command may be classified into the second logical group. It indicates that a drawing target of the first drawing command needs to be drawn transparently. When the switch Alpha is in a disabled state, and/or when the blend function is in a disabled state, a corresponding first drawing command may be classified into the third logical group. It indicates that a drawing target of the first drawing command does not need to be drawn transparently.

For example, refer to code in lines 66769 to 66773. Because a GL_BLEND attribute in line 66771 (that is, code shown in bold) is in a disabled (disable) state, it indicates that when a drawing command following a drawing command to which line 66771 belongs is used, a to-be-drawn drawing target is to be drawn in a non-transparent drawing manner until the GL_BLEND attribute is switched to an enabled state. Therefore, drawing commands to which codes after line 66771 and before the GL_BLEND attribute is switched to an enabled state belong are classified into the third logical group. A drawing parameter carried in the code in line 66771 is GL_BLEND, and is used to indicate that a drawing mode used when a drawing target is generated is a blend mode. To be specific, if the drawing target and another drawing target overlap at a location, a color in this location should be a blended color of colors of the drawing target and the another drawing target.

Line 66769: glClearBufferfv(buffer=GL_COLOR, drawbuffer=0, value=[0.0,0.0,0.0,1.0])

Line 66770: glClearBufferfi(buffer=GL_DEPTH STENCIL, drawbuffer=0,depth=0.0, stencil=0)

Line 66771: glDisable(cap=GL_BLEND)

Line 66772: glClearMask(red=GL_FALSE,green=GL_FALSE,blue=GL_FALSE,alpha=GL_FALSE)

Line 66773: glViewport(x=0, y=0, width=0, height=720)

It should be noted that, a first drawing command is classified into a logical group based on a drawing function used for the first drawing command or a change of carried vertex information, or a first drawing command may be classified into a logical group based on another feature of a drawing model represented by vertex information. For example, when the drawing model is the character Arthur King shown in FIG. 7, a specified rule may be queried based on the drawing model. When the specified rule indicates that the Arthur King does not need to be drawn transparently, all drawing commands used to generate the Arthur King may be classified into the third logical group. In this case, the third logical group may also be referred to as a non-transparent logical group. When the specified rule indicates that the King Arthur needs to be drawn transparently, all drawing commands corresponding to the King Arthur may be classified into the second logical group. In this case, the second logical group may also be referred to as a transparent logical group. Alternatively, a plurality of drawing commands may be separately classified into corresponding logical groups based on a shape feature of the drawing model. For example, corresponding drawing commands may be separately classified into a tree logical group, a house logical group, a background logical group, a character logical group, or another shape logical group based on the shape feature of the drawing model. This is not specifically limited in this application.

In addition, in an implementation process of the image rendering method provided in this embodiment of this application, whether to perform step 203 may be selected based on an actual requirement. To be specific, optionally, one or more first drawing commands may be first classified into logical groups, and then in a same logical group, a drawing command in the first image command stream is compared with a drawing command in a second image command stream. Alternatively, step 203 may optionally not be performed. After the first image command stream of the image frame is obtained, a process of comparing a drawing parameter of a drawing command in the first image command stream and a drawing parameter of a drawing command in a second image command stream may be directly performed. For example, after step 202 is completed, step 204 to step 206 may be directly performed, and then whether to perform step 207 is determined based on a comparison result.

Because a plurality of drawing targets are generated based on a plurality of first drawing commands that have a same command attribute, the plurality of drawing targets can be combined for rendering in a rendering process. Therefore, one or more first drawing commands are classified into different logical groups, so that drawing targets corresponding to a same logical group can be combined for rendering in a rendering process, to further reduce the load of the graphics processing unit. In addition, if the drawing target needs to be reused in a subsequent image frame, a probability that a rendering error occurs in an image rendering process of the subsequent image frame can also be reduced.

Step 204: The CPU determines a priority of a drawing command in a second image command stream of a rendered image frame.

A priority of a drawing command is used to indicate a possibility that the drawing command is repeated in comparison with the drawing command of the rendered image frame, and the possibility is positively correlated with the priority. Optionally, the priority of the drawing command may be determined in at least the following two implementations.

In a possible implementation, the priority of the drawing command may be determined based on a case in which drawing model information is carried in the drawing command.

In this implementation, because each drawing command carries drawing model information of a to-be-generated drawing target, a target parameter of the drawing target generated based on the drawing command may be estimated based on vertex information or the like corresponding to the drawing model information, and a priority of the drawing command is determined based on the target parameter. In addition, the priority is positively correlated with the target parameter. For example, when the target parameter is greater than or equal to a specified parameter threshold, the priority of the drawing command is set to a highest priority. When the target parameter is less than a specified parameter threshold, the priority of the drawing command is set to a lowest priority. The target parameter may be a parameter such as a surface area of a generated 2D graph or power consumption of generating the drawing target.

Alternatively, a priority of a drawing command that carries target drawing model information may be set to a highest priority, and a priority of a drawing command that does not carry the target drawing model information may be set to a lowest priority. The target model information is used to indicate a marked drawing model, and the marked drawing model may be a drawing model corresponding to a reusable drawing target in the rendered image frame.

For example, in a rendering process of the rendered image frame, a reusable drawing target a and a reusable drawing target b are reused, a drawing model corresponding to the reusable drawing target a is a drawing model a1, and a drawing model corresponding to the reusable drawing target b is a drawing model b1. In this case, both the drawing model a1 and the drawing model b1 are marked drawing models. If a drawing command carries drawing model information of either the drawing model a1 or the drawing model b1, it may be determined that a priority of the drawing command is a highest (or a higher) priority. If a drawing command does not carry drawing model information of either reusable drawing target, it may be determined that a priority of the drawing command is a lowest (or lower) priority.

The reusable drawing target a and the reusable drawing target b are drawing models that are reused in the rendered image frame, that is, in the rendered image frame and the rendered image frame that is used for comparison in a process of rendering the rendered image frame, neither the reusable drawing target a nor the reusable drawing target b changes. Therefore, both the reusable drawing target a and the reusable drawing target b may be referred to as static targets, and correspondingly, a non-reusable drawing target may be referred to as a non-static target, a drawing command used to generate the static target may be referred to as a static drawing command (which may also be referred to as a static command), and a drawing command used to generate the non-static target may be referred to as a non-static drawing command (which may also be referred to as a non-static command). In this case, the static drawing command is equivalent to a drawing command with a highest priority, and the non-static drawing command is equivalent to a command with a lowest priority.

In addition, an operation of marking a drawing model may be performed after it is determined that the drawing target is a reusable drawing target. Furthermore, to ensure accuracy of determining a priority of a drawing command based on the mark, the mark may be refreshed or canceled based on an actual rendering situation. For example, for an image frame 1, an image frame 2, and an image frame 3 that are adjacent in a time sequence, in a process of rendering the image frame 1, if it is determined that a drawing target a is a reusable drawing target, the drawing target a may be marked. In a process of rendering the image frame 2, if it is determined that the drawing target a is no longer a reusable drawing target, a mark of the drawing target a may be canceled; or if it is determined that the drawing target a is still a reusable drawing target, the mark may be kept valid.

In an actual scenario, images corresponding to some drawing models are unlikely to change. Therefore, when a drawing command carries information about these drawing models (that is, marked drawing models), a probability that a drawing parameter of the drawing command is the same as a drawing parameter of a drawing command of the rendered image frame is relatively high. In this way, a priority of a drawing command is determined based on a case in which a marked drawing model is carried; and in a subsequent comparison process, when comparison is performed in descending order of priorities, drawing commands with a relatively high probability that the drawing commands are the same can be preferentially compared, and whether to compare drawing commands with a relatively low probability that the drawing commands are the same is selected based on an actual requirement. This can increase a rendering speed of the entire rendering process. In addition, when compared drawing parameters are the same, a corresponding drawing target may be reused, so that the load of the graphics processing unit can be greatly reduced.

In another possible implementation, a drawing model may be specified in a drawing model library in advance based on an actual requirement. Correspondingly, the target drawing model information may be used to indicate the specified drawing model. Therefore, when a priority of a drawing command is determined, a priority of a drawing command that carries the target drawing model information may be set to a highest priority, and a priority of a drawing command that does not carry the target drawing model information may be set to a lower or lowest priority.

An area of each drawing model in the model library may be determined based on vertex information of the drawing model. When an area of a drawing model is greater than or equal to a specified area threshold, the drawing model is determined as the specified drawing model. Alternatively, power consumption of generating a drawing target based on the drawing model may be estimated. When the power consumption of the drawing model is greater than or equal to a specified power consumption threshold, the drawing model is determined as the specified drawing model.

When an area of a drawing model is relatively large, power consumption of generating a drawing target corresponding to the drawing model is relatively high. When comparison is performed in descending order of priorities in a subsequent process, drawing parameters corresponding to drawing targets with relatively high power consumption can be preferentially compared, and whether to compare drawing parameters corresponding to drawing targets with relatively low power consumption is selected based on an actual requirement. This can increase the rendering speed of the entire rendering process. In addition, when compared drawing parameters are the same, a corresponding drawing target may be reused, so that the load of the graphics processing unit can be greatly reduced.

Optionally, the rendered image frame may be any image frame for which a rendering process has been completed. For example, the rendered image frame may be an image frame adjacent to the to-be-rendered image frame in a time sequence in image frames that have been rendered, that is, the rendered image frame may be a previous-frame image of the to-be-rendered image frame. In a plurality of image frames that have been rendered, the previous-frame image is an image frame with a highest probability that image content is similar to image content of the to-be-rendered image frame in the plurality of image frames. Therefore, when the rendered image frame is the previous-frame image, in comparison with another image frame that has been rendered, there is a largest probability that a drawing parameter of the drawing command in the second image command stream of the previous-frame image is the same as a drawing parameter of the drawing command in the first image command stream of the to-be-rendered image frame. In a subsequent image rendering process, a drawing target in the previous-frame image can be used more frequently to perform image rendering on the to-be-rendered image frame, so that the load of the graphics processing unit can be greatly reduced.

After a priority of the drawing command in the second image command stream is determined, information such as a drawing model in a priority determining process and the priority result may be recorded in a memory, so that the information can be directly read and used in the image rendering process of the image frame. For example, information about a marked drawing model may be read, and a priority of the drawing command in the first image command stream is determined based on the information about the marked drawing model.

Step 205: The CPU determines a priority of the first drawing command in the first image command stream.

For an implementation process of step 205, refer to an implementation process of step 204. It should be noted that step 204 may be performed at a moment shown in FIG. 5 or may be performed when the rendered image frame is rendered, or the priority may be preconfigured.

Step 206: The CPU compares a first drawing command with a drawing command in the second image command stream in descending order of priorities, where the first drawing command and the drawing command in the second image command stream have a same priority and are located in a same logical group.

In a process of performing step 206, the first drawing command may be successively compared with the drawing command in the second image command stream (for ease of description, the drawing command in the second image command stream is referred to as a second drawing command below) in descending order of priorities, where the first drawing command and the drawing command in the second image command stream have the same priority and are located in the same logical group. In addition, after a process of comparing a first drawing command and a second drawing command that have a higher priority is completed, whether a first drawing command and a second drawing command that have a lower priority need to be compared may be determined based on an actual requirement. After it is determined that the first drawing command and the second drawing command that have a lower priority need to be compared, the first drawing command and the second drawing command that have a lower priority are compared.

For example, assuming that priorities of first drawing commands of the image frame include a highest priority and a lowest priority, after a first drawing command and a second drawing command that have the highest priority are compared, if a real-time frequency of the GPU is higher than a specified threshold, it may be determined that a first drawing command and a second drawing command that have the lowest priority need to be compared. In this case, the first drawing command and the second drawing command that have the lowest priority may be compared.

A priority of a drawing command is used to indicate a possibility that the drawing command is repeated in comparison with the drawing command of the rendered image frame, and the possibility is positively correlated with the priority. Therefore, a same drawing model may also exist in the first drawing command and the second drawing command that have a lower priority, and the first drawing command and the second drawing command are correspondingly the same. In this case, a reuse probability of a pre-generated drawing target may be further increased by comparing the first drawing command and the second drawing command that have a lower priority, to further reduce the load of the graphics processing unit.

Optionally, when the first drawing command and the second drawing command are compared, a floating threshold may be set for drawing parameters in the commands. To be specific, when a variation of the drawing parameter in the first drawing command relative to the corresponding drawing parameter in the second drawing command is less than the floating threshold, it may be considered that the drawing parameter in the first drawing command is the same as the corresponding drawing parameter in the second drawing command.

Optionally, in a same logical group, after it is determined that a same drawing command exists, an implementation process of step 206 may further include: when the priority of the first drawing command is not the highest, setting the priority of the first drawing command to be the highest. In this way, a current image frame is used as an image frame of the rendered image frame, and a priority of a drawing command in the image command stream of the first drawing command with the highest priority may be determined based on a drawing model in the first drawing command with the highest priority.

A specific method for comparing drawing commands is not limited in this application. An algorithm may be set based on a feature of a drawing command, parameters that need to be the same, and the like. For example, parameters that need to be the same in two drawing commands in two frames are extracted one by one and are compared one by one. Alternatively, priorities are set for parameters and key parameters are preferentially compared. For another example, it is assumed that parameters are associated, for example, if parameters A are the same, parameters B are definitely the same. In this case, an algorithm may be set to compare only the parameters A.

Step 207: When a same drawing command exists in the first image command stream and the second image command stream, the CPU instructs the graphics processing unit to obtain the reusable drawing target.

Optionally, the graphics processing unit may be instructed to obtain the reusable drawing target in at least the following two possible implementations.

In a possible implementation, the repeated drawing command (there may be one or more repeated drawing commands) may be replaced with a target indication command, and the target indication command is used to instruct the graphics processing unit to obtain the reusable drawing target, so that the graphics processing unit renders the image frame based on the reusable drawing target. The reusable drawing target is a drawing target that is generated in advance based on the target drawing command.

Optionally, the drawing command may further carry storage indication information. The storage indication information is used to indicate a storage location used to store a drawing target after the drawing target is generated based on the drawing command. Therefore, the CPU may obtain a storage location of the reusable drawing target, and instruct, by using the target indication command, the graphics processing unit to obtain the reusable drawing target from the storage location. In a possible implementation, the target indication command may carry a storage address of the reusable drawing target. After receiving the target indication command, the graphics processing unit may obtain the reusable drawing target from the storage location indicated by the storage address.

Alternatively, the drawing command may further carry an identifier of a to-be-generated drawing target. Therefore, the CPU may obtain a drawing target identifier of each generated drawing target; and instruct, by using the target indication command, the graphics processing unit to obtain the reusable drawing target indicated by a specified drawing target identifier. For example, the target indication command may carry the drawing target identifier of the reusable drawing target. After receiving the target indication command, the graphics processing unit may obtain the corresponding reusable drawing target based on the drawing target identifier. The drawing target identifier is used to uniquely identify the drawing target.

In another possible implementation, the repeated drawing command may be set to an invalid command, and then a target indication command is added to the first image command stream, where the target indication command is used to instruct the graphics processing unit to obtain the reusable drawing target, so that the graphics processing unit renders the image frame based on the reusable drawing target.

After a first drawing command is set to an invalid command, the graphics processing unit does not need to execute the first drawing command that is set to an invalid command, after receiving the first drawing command. Therefore, the load of the graphics processing unit can be reduced. For an implementation of adding the target indication command to the first image command stream, refer to an implementation of replacing the repeated first drawing command with the target indication command. Details are not described herein again.

For example, it is assumed that the first image command stream includes a plurality of first drawing commands, and a first drawing command includes commands in the following lines 49763 to 49770 (content after "//" in a command in each line is a comment of the command in the line). The command in line 49763 is used to indicate that a drawing target identifier of a drawing target that has been drawn is 1, and commands in lines 49764 to 49770 are used to instruct to draw the drawing target based on parameters. In addition, it can be learned, based on presetting, that a texture identifier of a texture of the drawing target that has been drawn is 318. In other words, the texture identifier 318 may be used to represent the drawing target whose drawing target identifier is 1.

Line 49763: glBindFrameBuffer{target=GL_ FRAMEBUFFER, buffer=1}// indicates that the drawing target identifier of the to-be-generated drawing target is 1

Line 49764: glBindTexture{target=GL_TEXTURE_2D, texture=3}// indicates that the drawing target 1 uses the texture whose texture identifier is 3

Line 49765: glBlandFuncSeparate(sfactorRGB=GL SRC ALPHA,dfactorRGB=GL ONE MIMUS SRC ALPHA, sfactorAlpha=GL SRC ALPHA,dfactorAlph . . . )// indicates that an overlay color blend mode is used to process a color of the drawing target 1

Line 49766: glBindTexture{target=GL_TEXTURE_2D, texture=491}// indicates that the drawing target 1 uses a texture whose texture identifier is 491

Line 49767: gluseProgram(program=17)// indicates that a program whose program number is 17 on the GPU is invoked when the drawing target 1 is generated Line 49768: glUniform4fw{location=11,count=1,value= [1.0,1.0,1.0,0.0]}// indicates information about a material used for the drawing target 1

Line 49769: glUniform4fw{location=7,count=4,value= [16 elements . . . ]}// indicates information about a material used for the drawing target 1

Line 49770: glDrawElementsBaseVertexOES(mode= TRIANGLES,count=6,type=GL_UNSIGNED SHORT, indices=Ox3cc,basevertex=324)// indicates a drawing model on which the drawing target 1 is based and a parameter such as vertex information used to represent the drawing model A second drawing command in the second image command stream includes commands in the following lines 48422 to 48428, and the commands in the seven lines are used to generate a drawing target 2.

Line 48422: glBindTexture{target=GL_TEXTURE_2D, texture=3}// indicates that the drawing target 2 uses a texture whose texture identifier is 3

Line 48423: glBlandFuncSeparate(sfactorRGB=GL SRC ALPHA,dfactorRGB=GL ONE MIMUS SRC ALPHA, sfactorAlpha=GL SRC ALPHA,dfactorAlph . . . )// indicates that an overlay color blend mode is used to process a color of the drawing target 2

Line 48424: glBindTexture{target=GL_TEXTURE_2D, texture=491}// indicates that the drawing target 2 uses a texture whose texture identifier is 491

Line 48425: gluseProgram(program=17)// indicates that a program whose program number is 17 on the GPU is invoked when the drawing target 2 is drawn Line 48426: glUniform4fw{location=11,count=1,value= [1.0,1.0,1.0,0.0]}// indicates information about a material used for the drawing target 2

Line 48427: glUniform4fw{location=7,count=4,value= [16 elements . . . ]}// indicates information about a material used for the drawing target 2

Line 48428: glDrawElementsBaseVertexOES(mode= TRIANGLES,count=6,type=GL_UNSIGNED SHORT,indices= Ox3cc,basevertex=324)// indicates a drawing model on which the drawing target 2 is based and a parameter such as vertex information used to represent the drawing model By comparing a plurality of lines of commands in the first drawing command with a plurality of lines of commands in the second drawing command respectively, it may be determined that the parameter indicating the texture identifier in the command in line 49764 is correspondingly the same as the parameter indicating the texture identifier in the command in line 48422, the parameter indicating the color bend mode in the command in line 49765 is correspondingly the same as the parameter indicating the color bend mode in the command in line 48423, the parameter indicating the texture identifier in the command in line 49766 is correspondingly the same as the parameter indicating the texture identifier in the command in line 48424, the parameter indicating that the program on the GPU is invoked in the command in line 49767 is correspondingly the same as the parameter indicating that the program on the GPU is invoked in the command in line 48425, the parameter indicating the material in the command in line 49768 is correspondingly the same as the parameter indicating the material in the command in line 48426, the parameter indicating the material in the command in line 49769 is correspondingly the same as the parameter indicating the material in the command in line 48427, and the parameter indicating the drawing model and the parameter such as vertex information used to represent the drawing model in the command in line 49770 is correspondingly the same as the parameter indicating the drawing model and the parameter such as vertex information used to represent the drawing model in the command in line 48428.

Therefore, it may be determined that the first drawing command and the second drawing command are used to draw a same drawing target, and the drawing target is a reusable drawing target. In this case, the following target indication command may be used to replace the first drawing command, to instruct the GPU to obtain the reusable drawing target that has been drawn in advance and render the image frame based on the reusable drawing target. The target indication command is:

glDrawElementsBaseVertexOES 99055 6 vertices,0 unique indices

The target indication command is a function body, and an expanded form of the function body is:

Line 99052: glUniform4fw{location=10,count=1,value=[0.0,0.0,0.0,0.0]}

Line 99053: glBindTexture{target=OL_TEXTURE_2D, texture=318}

Line 99054: glUniform4fw{location=6,count=4,value=[16 elements . . . ]}

It can be seen that a texture identifier 318 of the reusable drawing target is carried in line 99053. For example, a drawing target indicated by the drawing target identifier 318 is the icon M2 in FIG. 6. The CPU replaces the first drawing command with the target indication command, so that the GPU can obtain, in an image frame rendering process by executing the target indication command, the reusable drawing target indicated by the texture identifier 318, and does not need to execute the first drawing command. Therefore, the load of the GPU can be reduced.

Certainly, after obtaining the reusable drawing target, the CPU further needs to generate another drawing target based on another first drawing command in the first image command stream, to finally obtain an image of the image frame.

For example, the image frame may include a plurality of drawing targets arranged in a sequence. In an image rendering process, all drawing targets may be successively drawn in the sequence. When a reusable drawing target is to be drawn, the reusable drawing target may be directly obtained based on a target indication command. For example, it is assumed that the image frame includes a person, a tree, and a house that need to be successively drawn, and the tree is a reusable drawing target. In a drawing process of the image frame, the person may be drawn by executing a drawing command corresponding to the person, the tree is drawn at a time by executing a target indication command, and then the house is drawn by executing a drawing command corresponding to the house, to obtain display data of the image frame.

Figure 8:
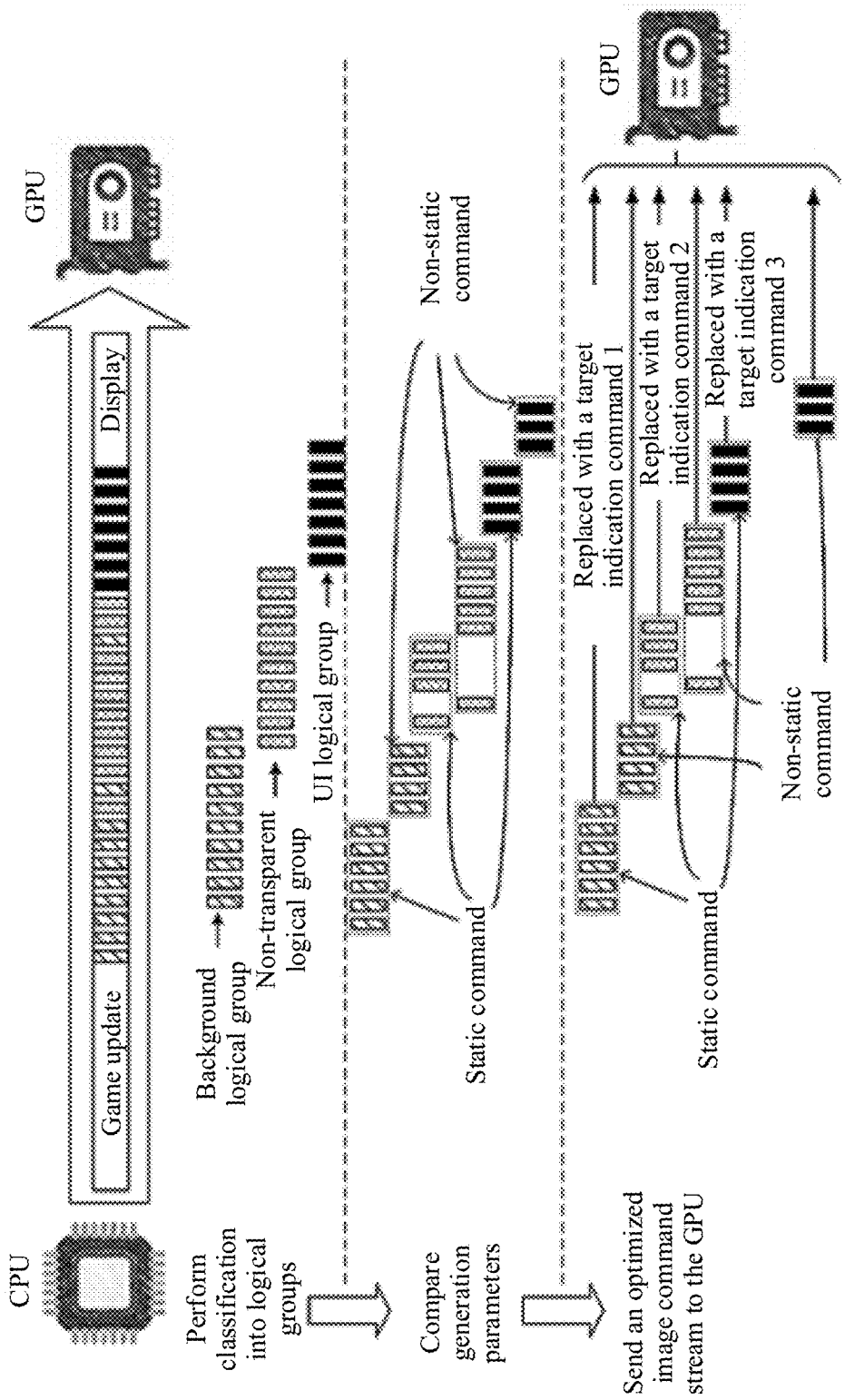
FIG. 8 is a schematic diagram of a specific process of processing a drawing command according to this application.

The following describes, with reference to FIG. 4 and FIG. 8, an image rendering method provided in an embodiment of this application, and describes, with reference to FIG. 9 to FIG. 12, beneficial effects of the image rendering method.

When a game application runs on a terminal, a game layer module 01 running on a CPU converts logic of a game into a first image command stream, where the first image command stream includes a first drawing command. In FIG. 8, each of blocks filled with dots, blocks filled with slashes, and blocks filled with black represents one first drawing command. In addition, after the CPU determines, based on an implementation process of step 201, that a process to which a current image frame belongs is an optimizable process, the game layer module 01 may send the first image command stream to a system graphics optimization module 022. After receiving the first image command stream, the system graphics optimization module 022 may separately classify, based on an implementation process of step 203, the plurality of first drawing commands into a background logical group, a non-transparent logical group, and a UI logical group. Then, the system graphics optimization module 022 may compare, based on an implementation process of step 204 to step 206, the first drawing command with a second drawing command, and may determine a static command and a non-static command in each logical group after the comparison. Then, the system graphics optimization module 022 may replace the static command with a corresponding target indication command with reference to an implementation process of step 207, and send the non-static command and the target indication command that is a command after the replacement to a GPU by using another module, a DDR, and the like. After receiving the non-static command and the target indication command that is a command after the replacement, the GPU may obtain a reusable drawing target based on the target indication command, and generate a corresponding drawing target based on the non-static command, to obtain display data of the image frame.

Figure 9:
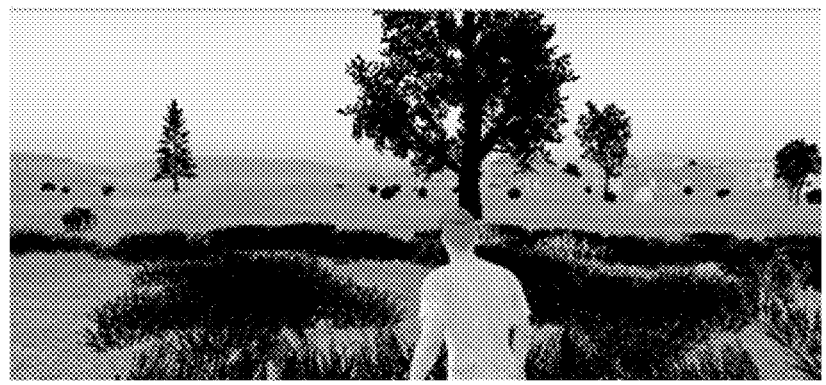
FIG. 9 is a schematic diagram of a to-be-rendered image frame according to this application.
Figure 10:
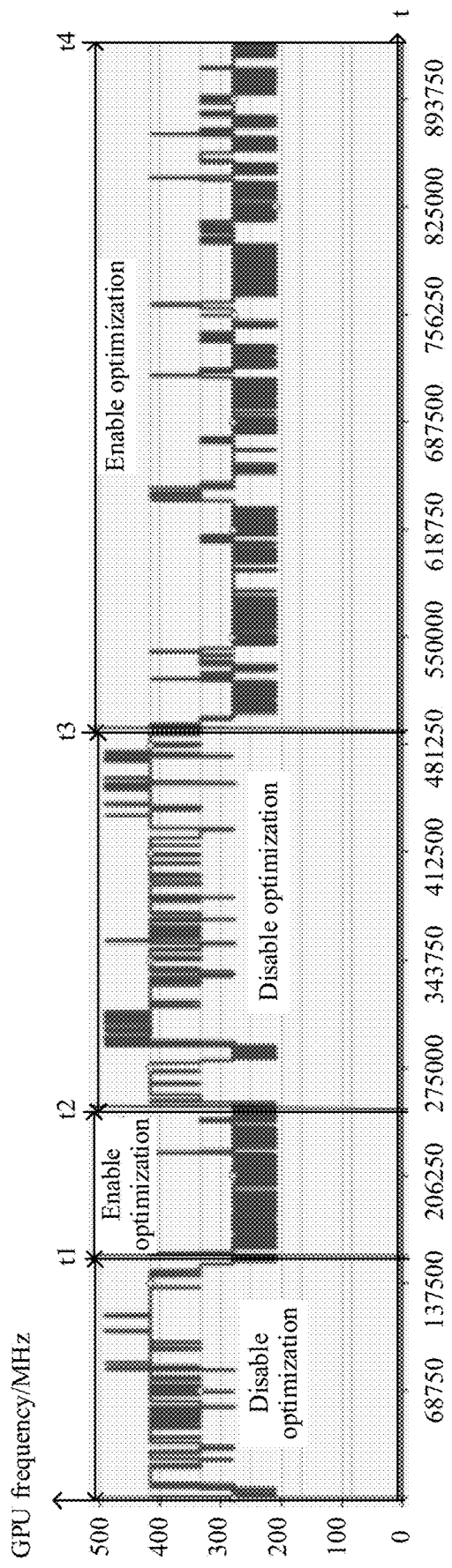
FIG. 10 is a schematic curve diagram of a frequency of a GPU in a process of performing image rendering on the to-be-rendered image frame shown in FIG. 9 according to this application.
Figure 11:
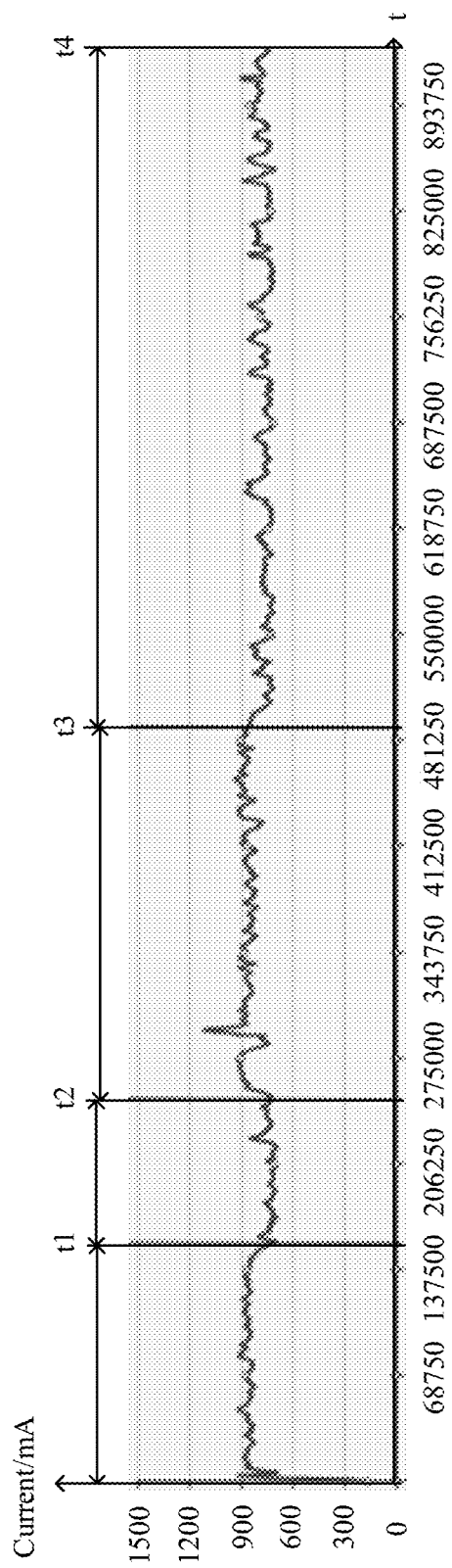
FIG. 11 is a schematic diagram of overall power consumption in a process of performing image rendering on the to-be-rendered image frame shown in FIG. 9 according to this application.

For example, FIG. 9 is a schematic diagram of an image frame. FIG. 10 is a schematic diagram of a frequency of a GPU in a process of performing image rendering on the image frame. FIG. 11 is a schematic diagram of a time-varying current of an electronic device in a process of performing image rendering on the image frame. In FIG. 10 and FIG. 11, curves in ranges of [0, t1] and [t2, t3] are curves obtained when image rendering is performed by using a related technology, and curves in ranges of [t1, t2] and [t3, t4] are curves obtained when image rendering is performed by using the image rendering method provided in the embodiments of this application. In addition, in a process of performing image rendering by using the image rendering method provided in the embodiments of this application, processing objects of the image rendering method include a black part in FIG. 9. By comparing a drawing parameter of a drawing command corresponding to the black part with a drawing parameter of a drawing command corresponding to a rendered image frame, it may be determined that the drawing parameters of the two parts are correspondingly the same. Therefore, a first drawing command corresponding to the black part may be replaced with a target indication command that carries storage location information of the black part. After receiving the target indication command, the GPU may directly obtain, from a storage location indicated by the storage location information, a reusable drawing target that is generated in advance based on the first drawing command corresponding to the black part, to draw, at a time in the image frame, an image corresponding to the black part. For the first drawing command that is replaced, refer to a command in the box in FIG. 12.

It can be learned, by comparing FIG. 10 with FIG. 11, that when the image rendering method provided in the embodiments of this application is used to perform image rendering, the frequency of the GPU may be reduced to 300 megahertz from 415 megahertz during image rendering performed by using the related technology. It may be determined that the image rendering method provided in the embodiments of this application significantly reduces the frequency of the graphics processing unit. In addition, the current of the electronic device is reduced to 780 mA from 900 mA during image rendering performed by using the related technology, and the current mainly reflects overall power consumption of the electronic device and heat generated by the terminal. Therefore, it may be determined that the image rendering method provided in the embodiments of this application effectively reduces the overall power consumption of the electronic device and reduces the heat generated the electronic device. In other words, it may be determined that the image rendering method provided in the embodiments of this application effectively reduces load of the GPU and power consumption of image rendering.

In conclusion, in comparison with the related technology, according to the image rendering method provided in this application, the graphics processing unit can directly use the generated reusable drawing target, thereby reducing power consumption of generating the drawing target, effectively reducing the load of the graphics processing unit, and reducing power consumption of an entire image rendering process.

In addition, although power consumption is reduced by using the method provided in this application, rendering resources for rendering an image are not reduced. Therefore, image quality of an image obtained through rendering can still be ensured.

Furthermore, in the image rendering process, rendering of a covered image is not omitted. Therefore, the method is applicable to image rendering in a scenario in which a fragment is discarded, depth information of a fragment is changed, or transparent drawing is used. Therefore, the image rendering method has a wider application scope.

It should be noted that, a sequence of the steps of the image rendering method provided in the embodiments of this application may be properly adjusted, and the steps may also be correspondingly added or reduced based on a situation. For example, whether to perform step 203 may be selected based on an actual requirement. Any variation method readily figured out by a person skilled in the art within the technical scope disclosed in the present invention shall fall within the protection scope of the present invention. Therefore, details are not described herein.

The following describes an apparatus embodiment of this application, and the apparatus embodiment may be used to perform the method embodiment of this application. For details that are not disclosed in the apparatus embodiment of this application, refer to the method embodiments of this application.

Figures 12, 13:
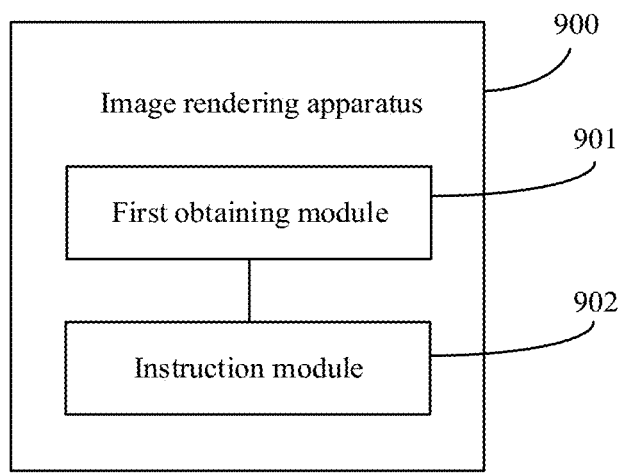
FIG. 12 is a schematic diagram of an image command stream according to this application.
FIG. 13 is a schematic structural diagram of an image rendering apparatus according to this application.

FIG. 13 is a block diagram of an image rendering apparatus 900 according to an example embodiment of this application. The apparatus 900 may be applied to a terminal, and the apparatus 900 may include:

a first obtaining module 901, configured to obtain a first image command stream of a first image frame, where the first image command stream includes one or more first drawing commands; and an instruction module 902, configured to, when a first target drawing command exists in the first image command stream, instruct a graphics processing unit to render the first image frame based on a reusable drawing target, where the first target drawing command is the same as a second target drawing command in a second image command stream of a rendered image frame, and the reusable drawing target is a drawing target generated based on the second target drawing command.

Optionally, the instruction module 902 is configured to replace a repeated drawing command in the first image command stream with a target indication command, where the target indication command is used to instruct the graphics processing unit to obtain the reusable drawing target, so that the graphics processing unit renders the image frame based on the reusable drawing target. The repeated drawing command includes one or more drawing commands in the first target drawing command.

All first target drawing commands or a part of first target drawing commands may be replaced. In some implementations, which first target drawing commands can be replaced are selected based on a feature of the to-be-rendered image frame. In some other implementations, which commands can be replaced and which commands cannot be replaced are preconfigured.

Optionally, the target indication command is used to instruct the graphics processing unit to obtain the reusable drawing target from a specified storage location. Alternatively, the target indication command is used to instruct the graphics processing unit to determine, as the reusable drawing target, a drawing target that carries a specified drawing target identifier.

Figure 14:
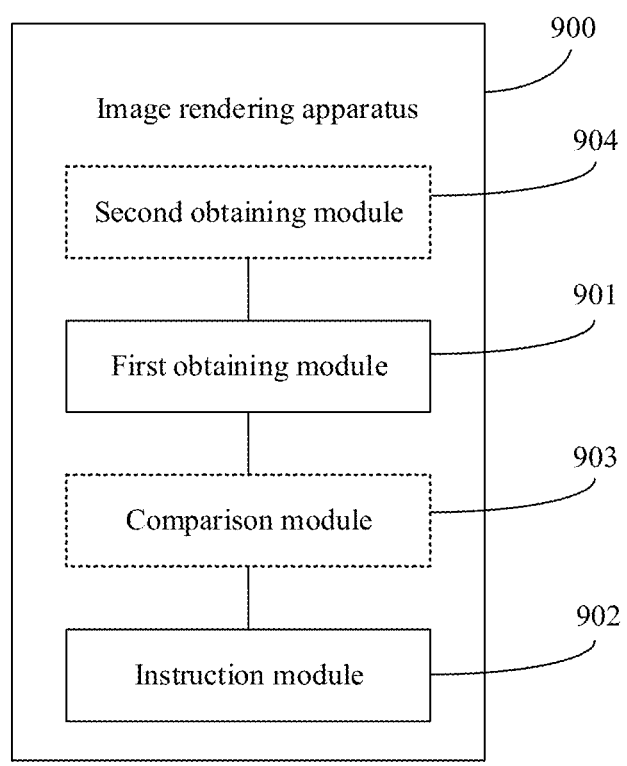
FIG. 14 is a schematic structural diagram of an image rendering apparatus according to this application.

Optionally, as shown in FIG. 14, the apparatus 900 may further include a comparison module 903, configured to compare the one or more first drawing commands with one or more second drawing commands in the second image command stream, to determine that the first target drawing command exists.

That a drawing command is a draw call in an open GL is used as an example. Draw calls in the two image command streams are compared. Specifically, APIs invoked by the draw calls and parameters may be separately compared to determine whether a same draw call exists. The parameters to be compared may include programs, textures, uniform, vertices, indices, and the like. Texture IDs need to be the same, and whether texture content corresponding to two image frames changes also needs to be checked. Program IDs need to be the same, and whether a corresponding shader changes also needs to be determined. In this way, the same draw call is determined.

Optionally, the comparison module 903 is specifically configured to: classify the one or more first drawing commands into logical groups based on a command attribute; and compare a first drawing command with a second drawing command, where the first drawing command and the second drawing command are in a same logical group, and the second drawing command is classified into a logical group in a same manner as the first drawing command.

Optionally, the command attribute includes one or two of the following: a drawing function used for the drawing command, or a change of vertex information carried in the drawing command, where the vertex information is used to identify a drawing model carried in the drawing command.

Optionally, manners of classification into logical groups include:

when values corresponding to a specified dimension in vertex coordinates included in at least two first drawing commands are equal, classifying all of the at least two first drawing commands into a first logical group, where the vertex coordinates are used to represent the vertex information, and the vertex information is used to identify the drawing model carried in the drawing command;

when a transparent drawing function included in the first drawing command is in an enabled state, classifying the first drawing command into a second logical group; and/or when a transparent drawing function included in the first drawing command is in a disabled state, classifying the first drawing command into a third logical group, where command attributes of the first drawing command included in the first logical group, the second logical group, and the third logical group are different.

In this application, it is not limited that all first drawing commands need to be classified into different logical groups during classification into logical groups. A part of first drawing commands may be classified, and another part of drawing commands do not need to be classified. For example, in a to-be-rendered image frame, if a part of images are newly added, drawing commands corresponding to the part of images are newly added, and are definitely different from a previously rendered image frame. In this case, this part of drawing commands may not participate in comparison, and are not classified into logical groups.

Optionally, the comparison module 903 is configured to compare drawing commands with a same priority in descending order of priorities of the drawing commands, where the priority is used to indicate a possibility that the drawing command is repeated, and the possibility is positively correlated with the priority. That the drawing command is repeated indicates that the drawing command also exists in a previous image frame.

Optionally, the comparison module 903 is further configured to set a priority of the repeated drawing command to be the highest.

Optionally, the drawing command carries drawing model information of a drawing target, the drawing model information is used to indicate a drawing model based on which the drawing target is generated, a priority of a drawing command that carries target drawing model information is higher than a priority of a drawing command that does not carry the target drawing model information, and the target drawing model information is used to indicate a marked drawing model.

Optionally, as shown in FIG. 14, the apparatus 900 may further include a second obtaining module 904, configured to obtain a process identifier of a process to which the image frame belongs.

Correspondingly, the first obtaining module 901 is configured to obtain the first image command stream when the process identifier is recorded in a target process list, where the target process list records a process identifier of at least one optimizable process.

Optionally, the rendered image frame is an image frame adjacent to the image frame in a time sequence in all image frames that have been rendered.

Optionally, the drawing parameter includes one or more of the following: vertex information of a drawing model, color information, or rendering material information.

In conclusion, according to the image rendering apparatus provided in this embodiment of this application, the GPU can directly use the generated reusable drawing target, thereby reducing power consumption of generating the drawing target by the GPU, and effectively reducing load of the GPU and power consumption of an entire image rendering process of the image frame.

In addition, because rendering resources used when image rendering is performed on an image are not reduced in the image rendering process, image quality of the image obtained through rendering can be ensured. Furthermore, in the image rendering process, rendering of a covered image is not omitted. Therefore, the apparatus is applicable to image rendering in a scenario in which a fragment is discarded, depth information of a fragment is changed, or transparent drawing is used. This ensures an application scope of the image rendering method.

It may be clearly understood by a person skilled in the art that, for the purpose of convenient and brief description, for a detailed working process of the foregoing apparatus and module, refer to a corresponding process in the foregoing method embodiments, and details are not described herein again.

In addition, the modules in the foregoing apparatus may be implemented by software, or a combination of software and hardware. When at least one module is hardware, the hardware may be a logic integrated circuit module, and may specifically include a transistor, a logic gate array, an algorithm logic circuit, or the like. When at least one module is software, the software exists in a form of a computer program product and is stored in a computer-readable storage medium. The software may be executed by a processor. Therefore, alternatively, the image rendering apparatus may be implemented by a processor by executing a software program. This is not limited in this embodiment.

An embodiment of this application further provides an image rendering apparatus, including a processor and a memory. When the processor executes a computer program stored in the memory, the image rendering apparatus performs the image rendering method provided in the embodiments of this application. Optionally, the image rendering apparatus may be deployed on a terminal.

An embodiment of this application further provides a storage medium. The storage medium may be a non-volatile computer-readable storage medium. The storage medium stores a computer program, and the computer program indicates a terminal to perform any image rendering method provided in the embodiments of this application. The storage medium may include: any medium that can store program code, for example, a read-only memory (read-only memory, ROM), a random access memory (random access memory, RAM), a magnetic disk, or an optical disc.

An embodiment of this application further provides a computer program product including instructions. When the computer program product is run on a computer, the computer is enabled to perform the image rendering method provided in the embodiments of this application. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

An embodiment of this application further provides a chip, for example, a CPU chip. The chip includes one or more physical cores and a storage medium. After reading computer instructions in the storage medium, the one or more physical cores implement the foregoing image rendering method. In some other embodiments, the chip may implement the foregoing image rendering method by using only hardware or a combination of software and hardware. To be specific, the chip includes a logic circuit. When the chip runs, the logic circuit is configured to implement any image rendering method in the first aspect. The logic circuit may be a programmable logic circuit. Similarly, a GPU may also be implemented in a manner in which a CPU is implemented.

A person of ordinary skill in the art may understand that all or a part of the steps of the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing descriptions are merely optional embodiments of this application, but are not intended to limit this application. Any modification, equivalent replacement, or improvement made without departing from the principle of this application shall fall within the protection scope of this application.

What is claimed is:

1. An image rendering method, wherein the method comprises:
    obtaining a first image command stream of a first image frame, wherein the first image command stream comprises one or more first drawing commands; and
    determining whether a first target drawing command exists in the first image command stream, and in response to determining that the first target drawing command exists in the first image command stream, instructing a graphics processing unit to render the first image frame based on a reusable drawing target, wherein the first target drawing command is the same as a second target drawing command in a second image command stream of a rendered image frame, and wherein the reusable drawing target is a drawing target generated based on the second target drawing command.

2. The method according to claim 1, wherein the instructing a graphics processing unit to render the first image frame based on a reusable drawing target comprises:
    replacing one or more drawing commands in the first target drawing command with a target indication command, wherein the target indication command is used to instruct the graphics processing unit to obtain the reusable drawing target.

3. The method according to claim 2, wherein:
    the target indication command is used to instruct the graphics processing unit to obtain the reusable drawing target from a specified storage location; or
    the target indication command is used to instruct the graphics processing unit to obtain the reusable drawing target that carries a specified drawing target identifier.

4. The method according to claim 1, wherein the method further comprises:
    comparing the one or more first drawing commands with one or more second drawing commands in the second image command stream to determine that the first target drawing command exists.

5. The method according to claim 4, wherein the comparing the one or more first drawing commands with one or more second drawing commands comprises:
    classifying the one or more first drawing commands into logical groups based on a command attribute; and
    comparing a first drawing command with a second drawing command, wherein the first drawing command and the second drawing command are in a same logical group, and wherein the second drawing command is classified into a logical group in a same manner as the first drawing command.

6. The method according to claim 5, wherein the command attribute comprises one or two of the following: a drawing function used for the drawing command, or a change of vertex information carried in the drawing command, and wherein the vertex information is used to identify a drawing model carried in the drawing command.

7. The method according to claim 5, wherein the classifying the one or more first drawing commands into logical groups based on a command attribute comprises one or more of the following classification manners:
    in response to determining that values corresponding to a specified dimension in vertex coordinates comprised in at least two first drawing commands are equal, classifying the at least two first drawing commands into a first logical group, wherein the vertex coordinates are used to represent vertex information, and wherein the vertex information is used to identify the drawing model carried in the drawing command;
    in response to determining that a transparent drawing function comprised in the first drawing command is in an enabled state, classifying the first drawing command into a second logical group; or
    in response to determining that a transparent drawing function comprised in the first drawing command is in a disabled state, classifying the first drawing command into a third logical group.

8. The method according to claim 4, wherein the comparing the one or more first drawing commands with one or more second drawing commands comprises:
    comparing drawing commands with a same priority in descending order of priorities of the drawing commands, wherein the priority is used to indicate a possibility that the drawing command is repeated, and wherein the possibility is positively correlated with the priority.

9. The method according to claim 8, wherein the method further comprises:
    setting a priority of the first target drawing command to be the highest.

10. The method according to claim 8, wherein the drawing command carries drawing model information of a drawing target, wherein the drawing model information is used to indicate a drawing model based on which the drawing target is generated, wherein a priority of a drawing command that carries target drawing model information is higher than a priority of a drawing command that does not carry the target drawing model information, and wherein the target drawing model information is used to indicate a marked drawing model.

11. The method according to claim 1, wherein the method further comprises:
obtaining a process identifier of a process to which the first image frame belongs; and
wherein the obtaining a first image command stream of a first image frame comprises:
determining whether the process identifier is recorded in a target process list, and in response to determining that the process identifier is recorded in the target process list, obtaining the first image command stream, wherein the target process list records a process identifier of at least one optimizable process.

12. The method according to claim 1, wherein the rendered image frame is an image frame adjacent to the first image frame in a time sequence in all image frames that have been rendered.

13. The method according to claim 1, wherein parameters compared when the drawing commands are compared comprise one or more of the following: vertex information of a drawing model, color information, or rendering material information.

14. An electronic device, comprising:
at least one processor;
a memory coupled to the at least one processor and storing programming instructions for execution by the at least one processor to perform operations comprising:
obtaining a first image command stream of a first image frame, wherein the first image command stream comprises one or more first drawing commands; and
determining whether a first target drawing command exists in the first image command stream, and in response to determining that the first target drawing command exists in the first image command stream, instructing a graphics processing unit to render the first image frame based on a reusable drawing target, wherein the first target drawing command is the same as a second target drawing command in a second image command stream of a rendered image frame, and wherein the reusable drawing target is a drawing target generated based on the second target drawing command; and
the graphics processing unit, wherein the graphics processing unit performs an image rendering operation under instruction of the at least one fir-4 processor.

15. The electronic device according to claim 14 wherein the instructing a graphics processing unit to render the first image frame based on a reusable drawing target comprises:
replacing one or more drawing commands in the first target drawing command with a target indication command, wherein the target indication command is used to instruct the graphics processing unit to obtain the reusable drawing target.

16. The electronic device according to claim 15, wherein:
the target indication command is used to instruct the graphics processing unit to obtain the reusable drawing target from a specified storage location; or
the target indication command is used to instruct the graphics processing unit to obtain the reusable drawing target that carries a specified drawing target identifier.

17. The electronic device according to claim 14, wherein the operations further comprise:
comparing the one or more first drawing commands with one or more second drawing commands in the second image command stream to determine that the first target drawing command exists.

18. The electronic device according to claim 17, wherein the comparing the one or more first drawing commands with one or more second drawing commands comprises:
classifying the one or more first drawing commands into logical groups based on a command attribute; and
comparing a first drawing command with a second drawing command, wherein the first drawing command and the second drawing command are in a same logical group, and wherein the second drawing command is classified into a logical group in a same manner as the first drawing command.

19. The electronic device according to claim 18, wherein the command attribute comprises one or two of the following: a drawing function used for the drawing command, or a change of vertex information carried in the drawing command, and wherein the vertex information is used to identify a drawing model carried in the drawing command.

20. The electronic device according to claim 18, wherein the classifying the one or more first drawing commands into logical groups based on a command attribute comprises one or more of the following classification manners:
in response to determining that values corresponding to a specified dimension in vertex coordinates comprised in at least two first drawing commands are equal, classifying the at least two first drawing commands into a first logical group, wherein the vertex coordinates are used to represent vertex information, and wherein the vertex information is used to identify the drawing model carried in the drawing command;
in response to determining that a transparent drawing function comprised in the first drawing command is in an enabled state, classifying the first drawing command into a second logical group; or
in response to determining that a transparent drawing function comprised in the first drawing command is in a disabled state, classifying the first drawing command into a third logical group.

* * * * *

UNITED STATES PATENT AND TRADEMARK OFFICE
CERTIFICATE OF CORRECTION

PATENT NO. : 11,816,775 B2
APPLICATION NO. : 17/482124
DATED : November 14, 2023
INVENTOR(S) : Fan Zhang et al.

Page 1 of 1

It is certified that error appears in the above-identified patent and that said Letters Patent is hereby corrected as shown below:

On the Title Page

Column 2 (item (57), Abstract), Line 6, after "stream" insert therefore -- , --;

In the Claims

Column 43, Line 48, Claim 14, after "one" please delete "fir-4".

Signed and Sealed this
Fourth Day of June, 2024

Katherine Kelly Vidal
*Director of the United States Patent and Trademark Office*